United States Patent
Ji et al.

(10) Patent No.: US 11,486,738 B2
(45) Date of Patent: Nov. 1, 2022

(54) ROTATION SENSING APPARATUS

(71) Applicant: Samsung Electro-Mechanics Co., Ltd., Suwon-si (KR)

(72) Inventors: Yong Woon Ji, Suwon-si (KR); Jong Woo Lee, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 321 days.

(21) Appl. No.: 16/661,464

(22) Filed: Oct. 23, 2019

(65) Prior Publication Data

US 2021/0033427 A1 Feb. 4, 2021

(30) Foreign Application Priority Data

Jul. 29, 2019 (KR) .................. 10-2019-0091714

(51) Int. Cl.
| | |
|---|---|
| *G01D 5/243* | (2006.01) |
| *G01D 5/14* | (2006.01) |
| *G01D 5/20* | (2006.01) |
| *G01D 5/22* | (2006.01) |
| *G01P 13/04* | (2006.01) |

(Continued)

(52) U.S. Cl.
CPC .......... *G01D 5/243* (2013.01); *G01D 5/2013* (2013.01); *G01D 5/244* (2013.01); *G01P 13/04* (2013.01); *G01D 5/145* (2013.01); *G01D 5/202* (2013.01); *G01D 5/225* (2013.01)

(58) Field of Classification Search
CPC ...... G01D 5/243; G01D 5/145; G01D 5/2013; G01D 5/202; G01D 5/225; G01D 5/241; G01D 5/244; G01P 13/04
See application file for complete search history.

(56) References Cited

U.S. PATENT DOCUMENTS

| | | | | |
|---|---|---|---|---|
| 5,382,899 A | * | 1/1995 | Funatsu | ............ G01D 5/24404 |
| | | | | 324/207.18 |
| 2014/0195117 A1 | * | 7/2014 | Kuwahara | ............... G01L 3/105 |
| | | | | 701/41 |
| 2016/0069712 A1 | | 3/2016 | Holenarsipur et al. | |

(Continued)

FOREIGN PATENT DOCUMENTS

| | | |
|---|---|---|
| JP | 2016-145729 A | 8/2016 |
| JP | 6217596 B2 | 10/2017 |

*Primary Examiner* — Melissa J Koval
*Assistant Examiner* — Joseph O Nyamogo
(74) *Attorney, Agent, or Firm* — NSIP Law

(57) ABSTRACT

A rotation sensing apparatus includes a detected part, a sensor unit, and a rotation information calculation circuit. The sensor unit includes a first sensor disposed opposite to a first pattern portion, a second sensor disposed opposite to a second pattern portion, a third sensor disposed to be spaced apart from the first sensor in the rotation direction and opposite to the first pattern portion, and a fourth sensor disposed to be spaced apart from the second sensor in the rotation direction and opposite to the second pattern portion. The rotation information calculation circuit is configured to sense the rotation direction, in response to a differential signal, generated based on the first oscillation signal and the second oscillation signal, and an oscillation signal corresponding to maximum and minimum frequencies, from among the first oscillation signal, the second oscillation signal, the third oscillation signal, and the fourth oscillation signal.

19 Claims, 17 Drawing Sheets

(51) Int. Cl.
    *G01D 5/241*     (2006.01)
    *G01D 5/244*     (2006.01)

(56) References Cited

U.S. PATENT DOCUMENTS

| | | | |
|---|---|---|---|
| 2016/0123769 A1* | 5/2016 | Nishimoto | G01D 5/2046 |
| | | | 324/207.23 |
| 2016/0231139 A1* | 8/2016 | Mizutani | G01R 15/202 |
| 2017/0003182 A1* | 1/2017 | Schweizer | G01L 3/109 |
| 2017/0089735 A1 | 3/2017 | Ruh | |
| 2018/0057988 A1* | 3/2018 | Davis | D06F 33/48 |
| 2019/0301893 A1* | 10/2019 | Ruigrok | G01D 5/145 |

\* cited by examiner

ROTATION SENSING APPARATUS

CROSS-REFERENCE TO RELATED APPLICATION(S)

This application claims benefit under 35 USC 119(a) of Korean Patent Application No. 10-2019-0091714 filed on Jul. 29, 2019 in the Korean Intellectual Property Office, the entire disclosure of which is incorporated herein by reference for all purposes.

BACKGROUND

1. Field

The following description relates to a rotation sensing apparatus.

2. Description of Related Art

Rotating bodies are used in various fields such as a motor and a wheel switch of a wearable device that are desired to have a small profile. A sensing circuit for sensing a position of a rotating body may be also required to detect a minute displacement of the rotating body.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a rotation sensing apparatus includes a detected part, a sensor unit, and a rotation information calculation circuit. The detected part, configured to rotate in a rotation direction, includes a first pattern portion with a plurality of first pattern members, and a second pattern portion with a plurality of second pattern members. The sensor unit includes a first sensor disposed opposite to the first pattern portion, a second sensor disposed opposite to the second pattern portion, a third sensor disposed to be spaced apart from the first sensor in the rotation direction and opposite to the first pattern portion, and a fourth sensor disposed to be spaced apart from the second sensor in the rotation direction and opposite to the second pattern portion. The rotation information calculation circuit is configured to calculate rotation information of a rotating body in response to a first oscillation signal, a second oscillation signal, a third oscillation signal, and a fourth oscillation signal generated based on respective outputs of the first sensor, the second sensor, the third sensor, and the fourth sensor. The rotation information calculation circuit is configured to sense the rotation direction, in response to a differential signal, generated based on the first oscillation signal and the second oscillation signal, and an oscillation signal corresponding to one of a maximum frequency and a minimum frequency, from among the first oscillation signal, the second oscillation signal, the third oscillation signal, and the fourth oscillation signal.

The rotation information calculation circuit may be further configured to sense the rotation direction, in response to a rising or falling period of the differential signal, and the oscillation signal corresponding to the maximum frequency and the minimum frequency.

The rotation information calculation circuit may be further configured to determine the rotation direction as a first direction, upon the oscillation signal corresponding to one of the maximum frequency and the minimum frequency corresponds to one of the first oscillation signal and the second oscillation signal, and the differential signal rises.

The rotation information calculation circuit may be further configured to determine the rotation direction as a second direction, corresponding to a direction opposite to the first direction, upon the oscillation signal corresponding to one of the maximum frequency and the minimum frequency corresponds to one of the first oscillation signal and the second oscillation signal, and the differential signal falls.

The rotation information calculation circuit may be further configured to determine the rotation direction as a second direction, corresponding to a direction opposite to the first direction, upon the oscillation signal corresponding to one of the maximum frequency and the minimum frequency corresponds to one of the third oscillation signal and the fourth oscillation signal, and the differential signal rises.

The rotation information calculation circuit may be further configured to determine the rotation direction as a first direction, upon the oscillation signal corresponding to one of the maximum frequency and the minimum frequency corresponds to one of the third oscillation signal and the fourth oscillation signal, and the differential signal falls.

The first oscillation signal and the third oscillation signal may have a phase difference of 180 degrees, and the second oscillation signal and the fourth oscillation signal may have a phase difference of 180 degrees.

The first oscillation signal and the second oscillation signal may have a phase difference of 90 degrees, and the third oscillation signal and the fourth oscillation signal may have a phase difference of 90 degrees.

The rotation information calculation circuit may be further configured to generate a first average signal by averaging the first oscillation signal and the second oscillation signal, and to generate a second average signal by averaging the third oscillation signal and the fourth oscillation signal.

The rotation information calculation circuit may be further configured to generate a first subtraction signal by subtracting the first average signal from the first oscillation signal, and to generate a second subtraction signal by subtracting the second average signal from the second oscillation signal.

The rotation information calculation circuit may be further configured to generate a first adjustment signal by a ratio of a frequency of the first subtraction signal to a difference between the maximum frequency and a frequency of the first average signal, and to generate a second adjustment signal by a ratio of a frequency of the second subtraction signal to a difference between the maximum frequency and a frequency of the second average signal.

The rotation information calculation circuit may be further configured to generate the differential signal by subtracting the second adjustment signal from the first adjustment signal.

The rotation information calculation circuit may be further configured to generate the differential signal by subtracting the second oscillation signal from the first oscillation signal.

The plurality of first pattern members may be configured to partially overlap the plurality of second pattern members in an extending direction of a rotary shaft.

The first sensor and the second sensor may be provided in a first plane, and the third sensor and the fourth sensor are provided in a second plane, having an angular difference from the first plane by a reference angle.

The plurality of first pattern members and the plurality of second pattern members may be arranged to have a same angular phase.

The first sensor and the second sensor may be configured to have an angular difference of a half of a reference angle and be spaced apart from each other in the rotation direction, and the third sensor and the fourth sensor may be configured to have an angular difference of the half of the reference angle and to be spaced apart from each other in the rotation direction.

In another general aspect, a rotation sensing apparatus includes a detected part, a sensor unit, and a rotation information calculation circuit. The detected part, configured to rotate in rotation directions, includes a first pattern portion with a plurality of first pattern members, and a second pattern portion with a plurality of second pattern members. The sensor unit includes sensors disposed in the rotation directions of the detected part. The rotation information calculation circuit is configured to calculate rotation information of a rotating body in response to oscillation signals based on respective outputs of the sensors, and sense the rotation directions, in response to a differential signal, generated based on a first oscillation signal of the oscillation signals and a second oscillation signal of the oscillation signals, and an oscillation signal corresponding to one of a maximum frequency and a minimum frequency, from among the oscillation signals.

The sensors may include a first sensor disposed opposite to the first pattern portion, a second sensor disposed opposite to the second pattern portion, a third sensor disposed to be spaced apart from the first sensor and opposite to the first pattern portion, and a fourth sensor disposed to be spaced apart from the second sensor and opposite to the second pattern portion.

The first oscillation signal, the second oscillation signal, a third oscillation signal of the oscillation signals, and a fourth oscillation signal of the oscillation signals may be generated based on respective outputs of the first sensor, the second sensor, the third sensor, and the fourth sensor.

The rotation information calculation circuit may be further configured to sense the rotation directions, in response to a rising or falling period of the differential signal, and the oscillation signal corresponding to the one of the maximum frequency and the minimum frequency.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
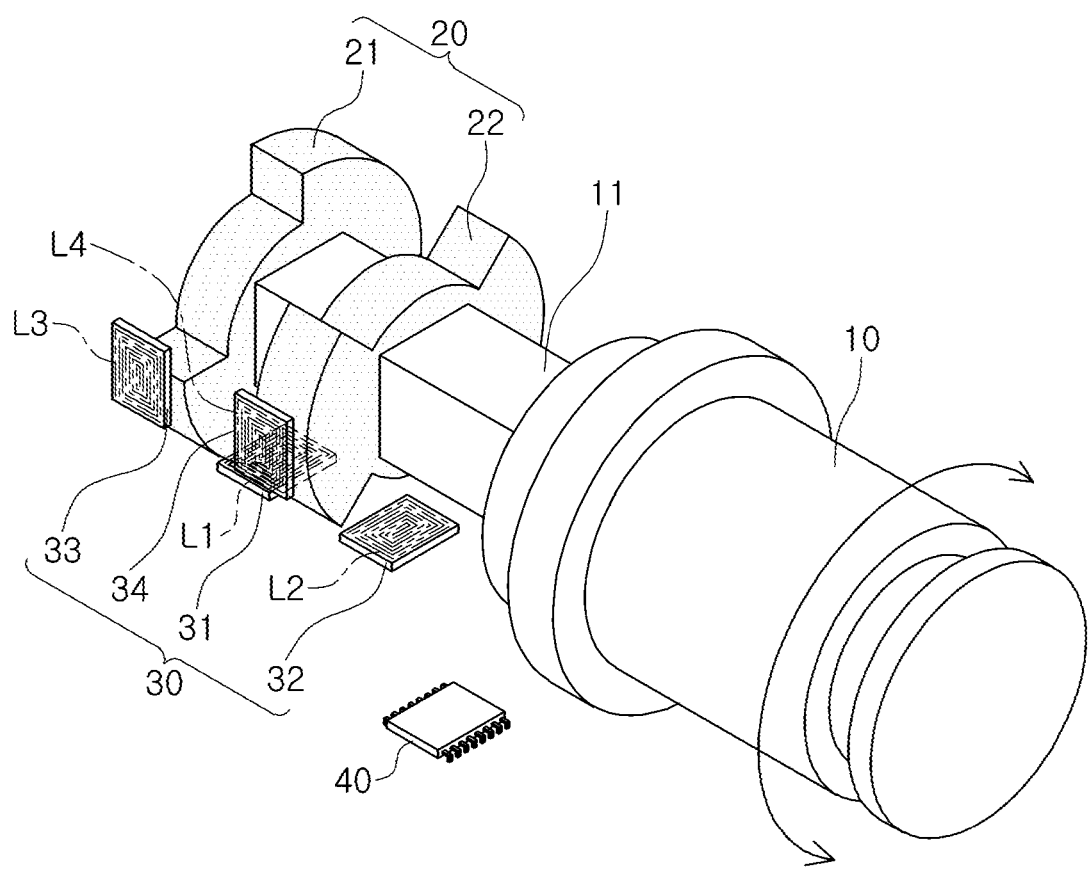
FIG. 1A is a configuration diagram of an example of a rotation sensing apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1B:
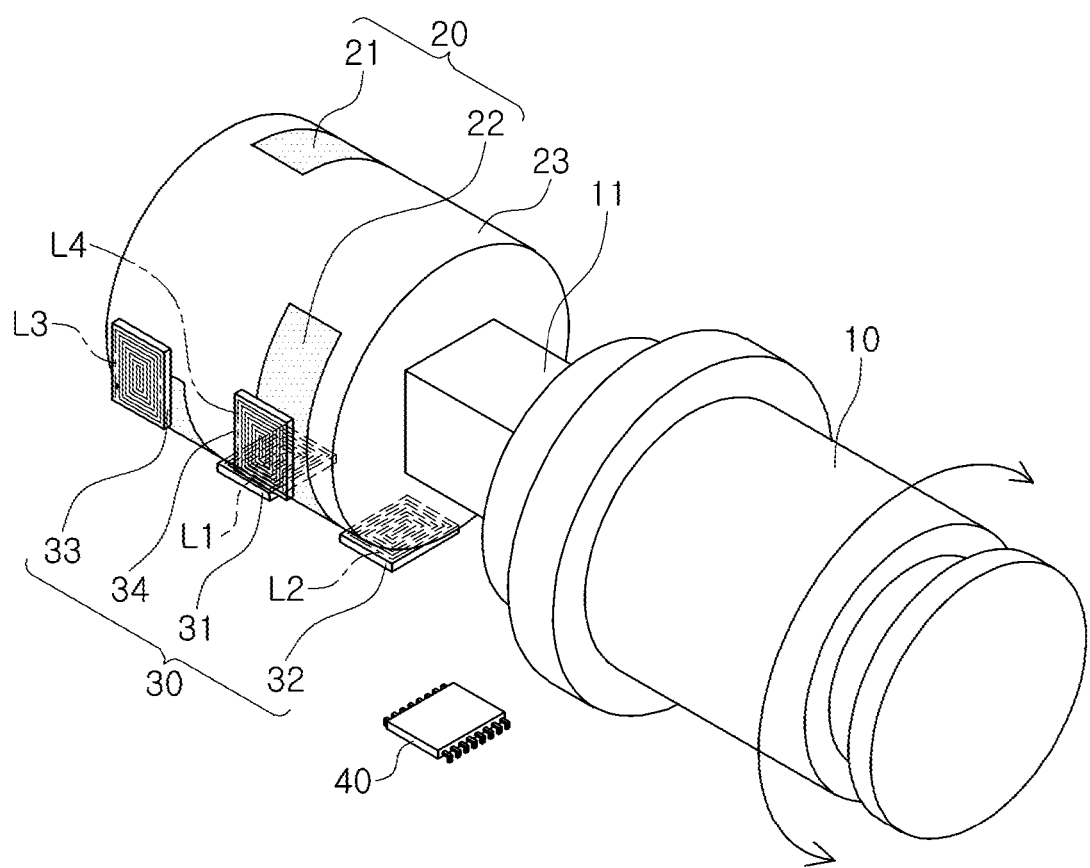
FIG. 1B is a configuration diagram illustrating a modified example of the rotation sensing apparatus in of FIG. 1A.
Figure 2A:
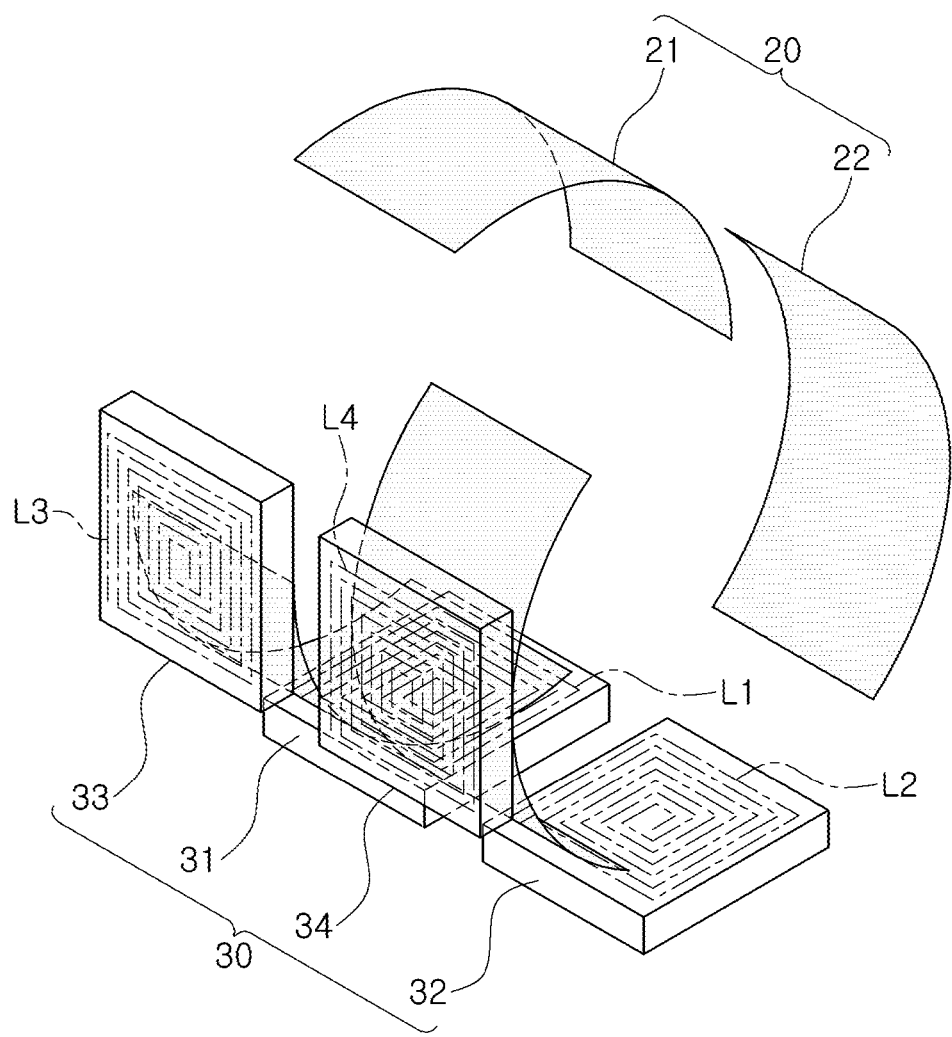
FIG. 2A is a schematic diagram of an example of a pattern portion and a sensor unit.
Figure 2B:
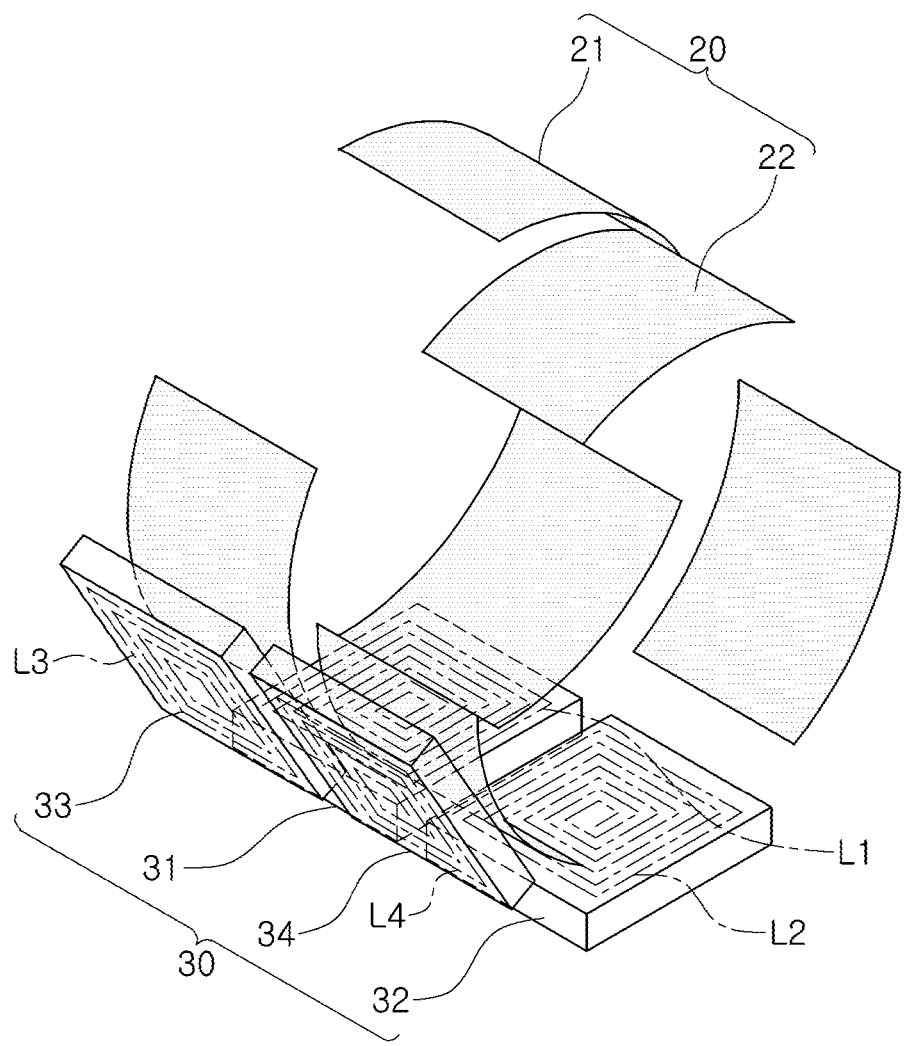
FIG. 2B is a schematic diagram of an example of a pattern portion and a sensor unit.

FIG. 1A is a configuration diagram of an example of a rotation sensing apparatus. FIG. 1B is a configuration diagram illustrating a modified example of the rotation sensing apparatus in FIG. 1A. FIG. 2A is a schematic diagram of an example of a pattern portion and a sensor unit. FIG. 2B is a schematic diagram of an example of a pattern portion and a sensor unit.

A rotation sensing apparatus according to the present disclosure may include a detected part 20, a sensor unit 30, and a rotation information calculation circuit 40.

Referring to FIG. 1A, the detected part 20 may be connected to a wheel 10 through a rotary shaft 11. The wheel 10 may be understood to be a rotating body employed in an electronic device and rotated by a user in a clockwise or counterclockwise direction. The detected part 20 may rotate clockwise or counterclockwise together with the wheel 10.

The detected part 20 may include a first pattern portion 21 and a second pattern portion 22. The first pattern portion 21 and the second pattern portion 22 may be formed to have the same shape, and may be spaced apart from each other in an extending direction of the rotary shaft 11. The first pattern portion 21 and the second pattern portion 22 may be coupled to the rotary shaft 11. The first pattern portion 21 and the second pattern portion 22 coupled to the rotating body may rotate in the same direction and at the same speed when the rotating body rotates.

Each of the first pattern portion 21 and the second pattern portion 22 may include a plurality of pattern members having the same shape. The first pattern portion 21 may include a plurality of first pattern members, and the second pattern portion 22 may include a plurality of second pattern members.

In FIG. 1A, protruded regions of the first pattern portion 21 and the second pattern portion 22 may correspond to a pattern member. For example, a plurality of first pattern members of the first pattern portion 21 and a plurality of second pattern members of the second pattern portion 22 may be manufactured by machining a disk-shaped piece of metal and a magnetic body to form teeth. Accordingly, the plurality of first pattern members of the first pattern portion 21 and the plurality of second pattern members of the second pattern portion 22 may be formed of a metal and a magnetic body.

The plurality of first pattern members of the first pattern portion 21 may extend in a rotation direction, and the plurality of second pattern members of the second pattern portion 22 may extend in a rotation direction. An extension length of the first pattern in the rotation direction may be defined by the size of the first pattern, and an extension length of the second pattern in the rotation direction may be defined by the size of the second pattern.

The plurality of first pattern members of the first pattern portion 21 may be disposed to be spaced apart from each other by a reference angle in the rotation direction. The plurality of second pattern members of the second pattern portion 22 may be spaced apart from each other by a reference angle. For example, a spacing distance between the plurality of first pattern members of the first pattern portion 21 may be the same as the size of the first pattern, and a spacing distance between the plurality of second pattern members of the second pattern portion 22 may be the same as a size of the second pattern.

As an example, referring to FIG. 2A, the reference angle may correspond to an angle of 90 degrees. Accordingly, the plurality of first pattern members of the first pattern portion 21 may have a size corresponding to the reference angle of 90 degrees, and the spacing distance between the plurality of first pattern members may correspond to the reference angle of 90 degrees. Accordingly, the first pattern portion 21 may have two first pattern members having a reference angle size of 90 degrees. Similarly, the plurality of second pattern members of the second pattern portion 22 may have a size corresponding to the reference angle of 90 degrees, and the spacing distance between the plurality of second pattern members may correspond to the reference angle of 90 degrees. Accordingly, the second pattern portion 22 may have two second pattern members having a reference angle size of 90 degrees.

In another example of the present disclosure, referring to FIG. 2B, the reference angle may correspond to an angle of the reference angle of 60 degrees. Accordingly, the first pattern portion 21 may have three first pattern members having a reference angle size of 60 degrees, and the second pattern portion 22 may have three second pattern members having a reference angle size of 60 degrees.

Hereinafter, for convenience of explanation, the first pattern portion 21 has two first pattern members having a reference angle size of 90 degrees, and the second pattern portion 22 has two second pattern members having a reference angle size of 90 degrees, which will be described hereinafter. The following description may also be applied to a pattern portion having various angular sizes and various numbers of pattern members.

The plurality of first pattern members of the first pattern portion 21 and the plurality of second pattern members of the second pattern portion 22 may be disposed to have a predetermined angular difference. For example, the plurality of first pattern members of the first pattern portion 21 and the plurality of second pattern members of the second pattern portion 22 may be disposed to have an angular difference of half of the reference angle.

Assuming that the first pattern portion 21 has two first pattern members having a reference angle size of 90 degrees and the second pattern portion 22 has two second pattern members having a reference angle size of 90 degrees, the plurality of first pattern members of the first pattern portion 21 and the plurality of second pattern members of the second pattern portion 22 may be disposed to have an angular difference of 45 degrees, corresponding to the half of the reference angle. Accordingly, the plurality of first pattern members of the first pattern portion 21 and the plurality of second pattern members of the second pattern portion 22 may partially overlap each other in a direction in which the rotary shaft 11 extends.

A sensing value output from a first sensor 31 and a sensing value output from a second sensor 32 may have a phase difference of 90 degrees of the angular difference between the first pattern portion 21 and the second pattern portion 22. In addition, a sensing value output from a third sensor 33 and a sensing value output from a fourth sensor 34 may have a phase difference of 90 degrees.

The sensor unit 30 may include a plurality of sensors. For example, the sensor unit 30 may include the first sensor 31, the second sensor 32, the third sensor 33, and the fourth sensor 34. The first sensor 31 and the second sensor 32 may be disposed in the extending direction of the rotary shaft 11 on a first plane. The first sensor 31 may be disposed opposite to the first pattern portion 21, and the second sensor 32 may be disposed opposite to the second pattern portion 22. In addition, the third sensor 33 and the fourth sensor 34 may be disposed in the extending direction of the rotary shaft 11 on a second plane. The third sensor 33 may be disposed opposite to the first pattern portion 21, and the fourth sensor 34 may be disposed opposite to the second pattern portion 22. The first plane and the second plane may be disposed to have an angular difference of a reference angle.

Based on the rotation of the first pattern portion 21 and the second pattern portion 22, the areas of the first sensor 31 and the third sensor 33 overlapping the first pattern of the first pattern portion 21 may change, and the areas of the second sensor 32 and the fourth sensor 34 overlapping the second pattern of the second pattern portion 22 may change. The first sensor 31 and the third sensor 33 may sense a change in the area overlapping the first pattern portion 21, and the second sensor 32 and the fourth sensor 34 may sense a change in the area overlapping the second pattern portion 22.

The first sensor 31, the second sensor 32, the third sensor 33, and the fourth sensor 34 may each have a size of half of the reference angle. In this case, the sizes of the first sensor 31, the second sensor 32, the third sensor 33, and the fourth sensor 34 may be understood as a distance corresponding to the direction in which the rotating body rotates.

The first sensor 31 and the third sensor 33 may be disposed to have an angular difference of the reference angle, and the second sensor 32 and the fourth sensor 34 may be disposed to have an angular difference of the reference angle. The first sensor 31 and the third sensor 33 may be disposed to have an angular difference of the size of the first pattern, such that the sensing value output from the first sensor 31 and the sensing value output from the third sensor 33 may have a phase difference of 180 degrees. The second sensor 32 and the fourth sensor 34 may be disposed to have an angular difference of the size of the second pattern, such that the sensing value output from the second sensor 32 and the sensing value output from the fourth sensor 34 may have a phase difference of 180 degrees.

As an example, in the case in which the first pattern portion 21 has two first pattern members having a size corresponding to the reference angle of 90 degrees and a spacing distance corresponding to the reference angle of 90 degrees, and the second pattern portion 22 has two second pattern members having a size corresponding to the reference angle of 90 degrees and a spacing distance of the reference angle of 90 degrees, the third sensor 33 may be disposed to have an angular difference of the reference angle of 90 degrees with the first sensor 31, and the fourth sensor 34 may be disposed to have an angular difference of the reference angle of 90 degrees with the second sensor 32, as illustrated in FIG. 2A.

As another example, in the case in which the first pattern portion 21 has three first pattern members having a size corresponding to the reference angle of 60 degrees and a spacing distance corresponding to the reference angle of 60 degrees and the second pattern portion 22 has three second pattern members having a size corresponding to the reference angle of 60 degrees and a spacing distance corresponding to the reference angle of 60 degrees, the third sensor 33 may be disposed to have an angular difference of the reference angle of 60 degrees with the first sensor 31, and the fourth sensor 34 may be disposed to have an angular difference of the reference angle of 60 degrees with the second sensor 32, as illustrated in FIG. 2B.

The above-described example described that the first sensor 31 and the second sensor 32 may be disposed in a first plane, the third sensor 33 and the fourth sensor 34 may be disposed in a second plane, having an angular difference from the first plane of a reference angle. The plurality of first pattern members of the first pattern portion 21 and the plurality of second pattern members of the second pattern portion 22 may be arranged to have an angular difference of half of the reference angle. According to an example, the plurality of first pattern members of the first pattern portion 21 and the plurality of second pattern members of the second pattern portion 22 may be arranged on the same angular phase without an angular difference, the first sensor 31 and the second sensor 32 may be arranged to have an angular difference of half of the reference angle, and the third sensor 33 and the fourth sensor 34 may be arranged to have an angular difference of half of the reference angle.

The first sensor 31, the second sensor 32, the third sensor 33 and the fourth sensor 34 may include sensing coils L1, L2, L3 and L4, respectively. The sensing coils L1, L2, L3 and L4 may be provided by forming a circuit pattern on a substrate. According to an example of the present disclosure, the sensing coils L1, L2, L3 and L4 may be formed of a wound inductor coil and a solenoid coil. The first sensor 31, the second sensor 32, the third sensor 33 and the fourth sensor 34 including the sensing coils L1, L2, L3 and L4 may sense a rotation angle and a rotation direction of the rotating body, by inductance varying depending on the area overlapping the first pattern portion 21 and the second pattern portion 22.

The rotation information calculation circuit 40 may be implemented as an integrated circuit and may be electrically connected to the first sensor 31, the second sensor 32, the third sensor 33, and the fourth sensor 34. The rotation information calculation circuit 40 may calculate rotation information including the rotation direction of the rotating body and the rotation angle of the rotating body, depending on a change in inductance of the first sensor 31, the second sensor 32, the third sensor 33 and the fourth sensor 34.

Referring to FIG. 1B, the rotation sensing apparatus according to the example of FIG. 1B may further include a support member 23 connected to the rotary shaft 11. The rotation sensing apparatus according to the example of FIG. 1B may be similar to the rotation sensing apparatus according to the example of FIG. 1A, and therefore, duplicate descriptions will be omitted and differences will mainly be described.

The support member 23 may be connected to the rotary shaft 11 to rotate around the rotary shaft 11 clockwise or counterclockwise based on the rotation of the wheel 10. For example, the support member 23 may be formed to have a cylindrical shape. The detected part 20 may be disposed on the support member 23 having the cylindrical shape. The detected part 20 may include the first pattern portion 21 and the second pattern portion 22 disposed on a side surface of the support member 23 having a cylindrical shape.

The first pattern portion 21 may include a plurality of first pattern members extending in the rotation direction in a first height region of the support member 23 formed to have a cylindrical shape, and a plurality of second pattern members extending in the rotation direction in a second height region of the support member 23 formed to have the cylindrical shape. The plurality of first pattern members of the first pattern portion 21 and the plurality of second pattern members of the second pattern portion 22 may be formed of a metal and a magnetic material.

The support member 23 according to the example may be formed of a non-metallic material such as plastic, and the first pattern portion 21 and the second pattern portion 22 may be formed of a metal. The support member 23 may be formed using plastic through an injection molding process, and the first pattern portion 21 and the second pattern portion 22 may be formed through a plating process.

The first pattern portion 21 and the second pattern portion 22 may be disposed on a side surface of the support member 23. For example, when the first pattern portion 21 and the second pattern portion 22 are disposed on the support member 23, a groove in which the first pattern portion 21 and the second pattern portion 22 may be disposed may be formed in the side surface of the support member 23 having a cylindrical shape. For example, the support member 23 may be provided with a step formed by the groove extending in the rotation direction. The first pattern portion 21 and the second pattern portion 22 may be disposed in the groove provided in the side surface of the support member 23 to be exposed externally. For example, thicknesses of the first pattern portion 21 and the second pattern portion 22 may be respectively the same as a thickness of the groove.

In the example of the rotation sensing apparatus of FIG. 1B, a thin pattern may be manufactured by an efficient mass production method such as an injection molding process and a plating process, which may be advantageous in terms of mass production and cost reduction.

Figure 3:
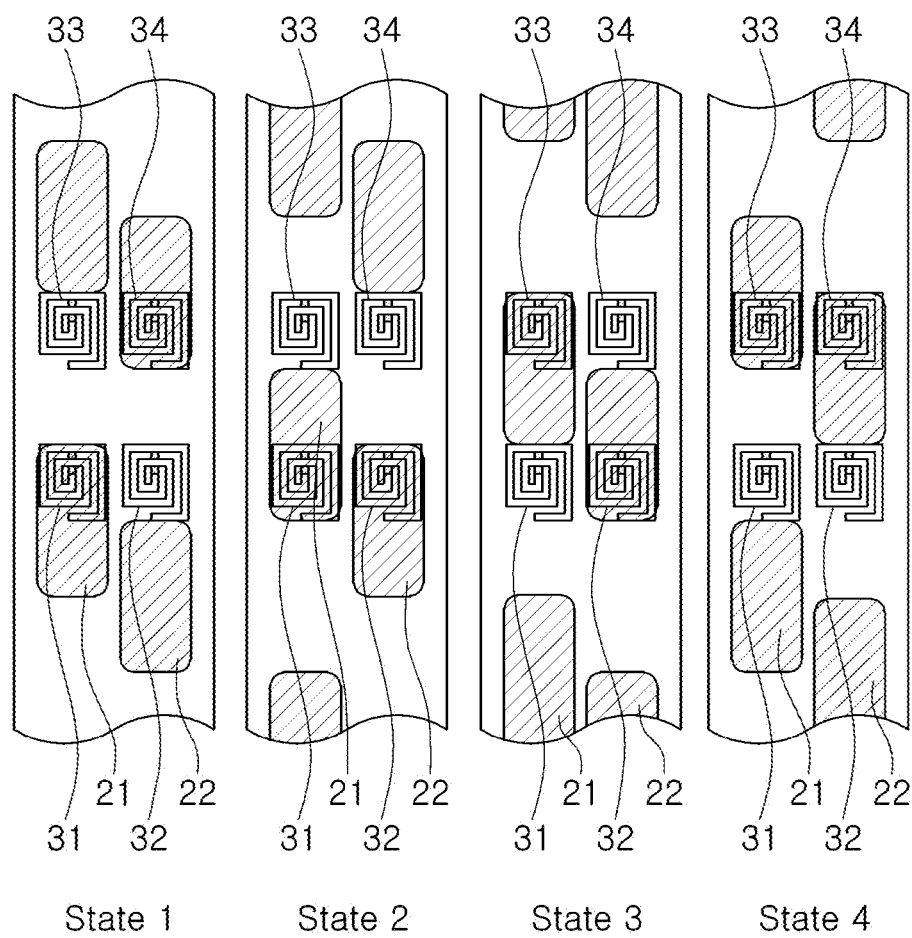
FIG. 3 is a view illustrating an example of a positional relationship between a detected part and a sensor unit, depending on a rotation of a detected part.
Figure 4:
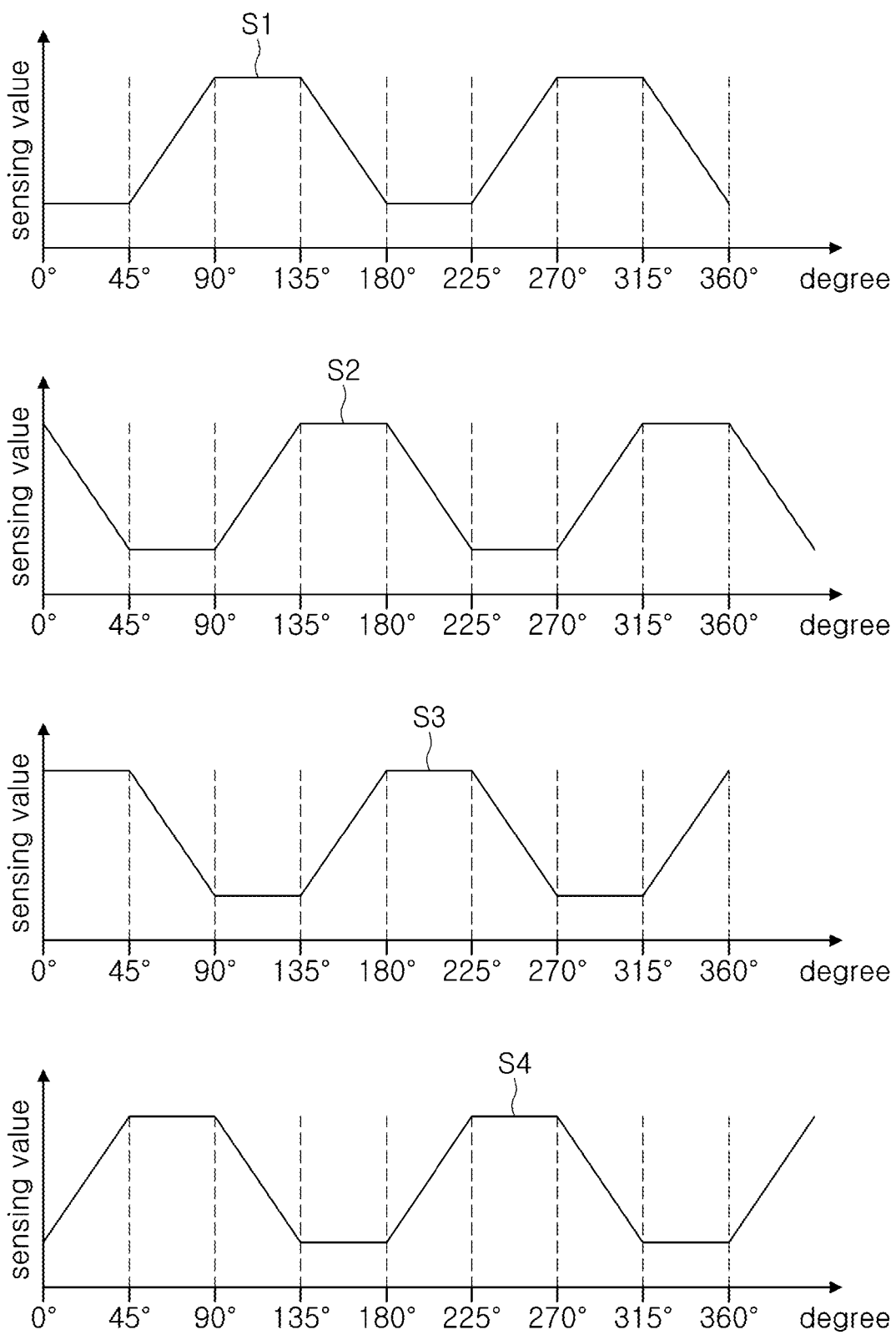
FIG. 4 provides graphs illustrating examples of sensing values measured by a sensor unit, depending on the rotation of a detected part.

FIG. 3 may be a view illustrating an example of a positional relationship between a detected part and a sensor unit, depending on a rotation of a detected part. FIG. 4 provides examples of graphs illustrating sensing values measured by a sensor unit, depending on rotation of a detected part. In FIG. 3, the first sensor 31 and the second sensor 32 may be illustrated in the form of a sensing coil provided as an example of the first sensor 31 and the second sensor 32.

Referring to FIG. 3, the area of overlap of the detected part 20 and the sensor unit 30 may be changed by the rotation of the wheel 10. In detail, the area of overlap between the first pattern portion 21, the first sensor 31 and the third sensor 33, and the area of overlap between the second pattern portion 22, the second sensor 32, and the fourth sensor 34 may be changed. A sensing value S1 of the first sensor 31 changes based on a change in the area of overlap of the first pattern portion 21 and the first sensor 31. A sensing value S3 of the third sensor 33 changes based on a change in the area of overlap of the first pattern portion 21 and the third sensor 33. A sensing value S2 of the second sensor 32 changes based on a change in the area of overlap of the second pattern portion 22 and the second sensor 32. A sensing value S4 of the fourth sensor 34 changes based on a change in the area of overlap of the second pattern portion 22 and the fourth sensor 34. The sensing values of the first to fourth sensors may correspond to inductance.

Hereinafter, for the sake of convenience, the change in the sensing value S1 of the first sensor 31 according to the change in the area of overlap of the first pattern portion 21 and the first sensor 31 will mainly be described. However, the following description may be applied to the change of sensing values of the remaining sensors.

In FIG. 3, a case in which the first pattern portion 21 and the second pattern portion 22 may be rotated in a direction from the lower side to the upper side may be described as an example. In State 1, the first sensor 31 may overlap the first pattern portion 21. For example, when the first pattern portion 21, formed of a metal material, is adjacent to the first sensor 31 constituting a sensing coil, current may be applied to the first pattern portion 21 by magnetic flux generated in the sensing coil, and magnetic flux may be generated in the first pattern portion 21 by the current applied to the first pattern portion 21. At this time, the magnetic flux generated in the first pattern portion 21 may cancel the magnetic flux of the sensing coil of the first sensor 31, and the inductance of the sensing coil of the first sensor 31 may decrease. Therefore, referring to 0 degree in FIG. 4, corresponding to State 1, the sensing value S1 of the first sensor 31 corresponds to a low level.

After the State 1, the first pattern portion 21 may rotate in a direction from a lower side to an upper side, and in State 2, the first sensor 31 may be still maintained to be in the state of overlapping the first pattern portion 21. Therefore, referring to 45 degrees in FIG. 4 corresponding to the State 2, the sensing value S1 of the first sensor 31 may be maintained at a low level.

After the State 2, the first pattern portion 21 may rotate in a direction from the lower side from the upper side, and in State 3, the first sensor 31 does not overlap the first pattern portion 21. Therefore, referring to 90 degrees of FIG. 4 corresponding to the State 3, the sensing value S1 of the first sensor 31 may be changed to a high level.

After the State 3, the first pattern portion 21 rotates upwardly from the lower side, and in State 4, the first sensor 31 still does not overlap the first pattern portion 21. Therefore, referring to 135 degrees of FIG. 4 corresponding to the State 4, the sensing value S1 of the first sensor 31 maintains the high level.

Figure 5A:
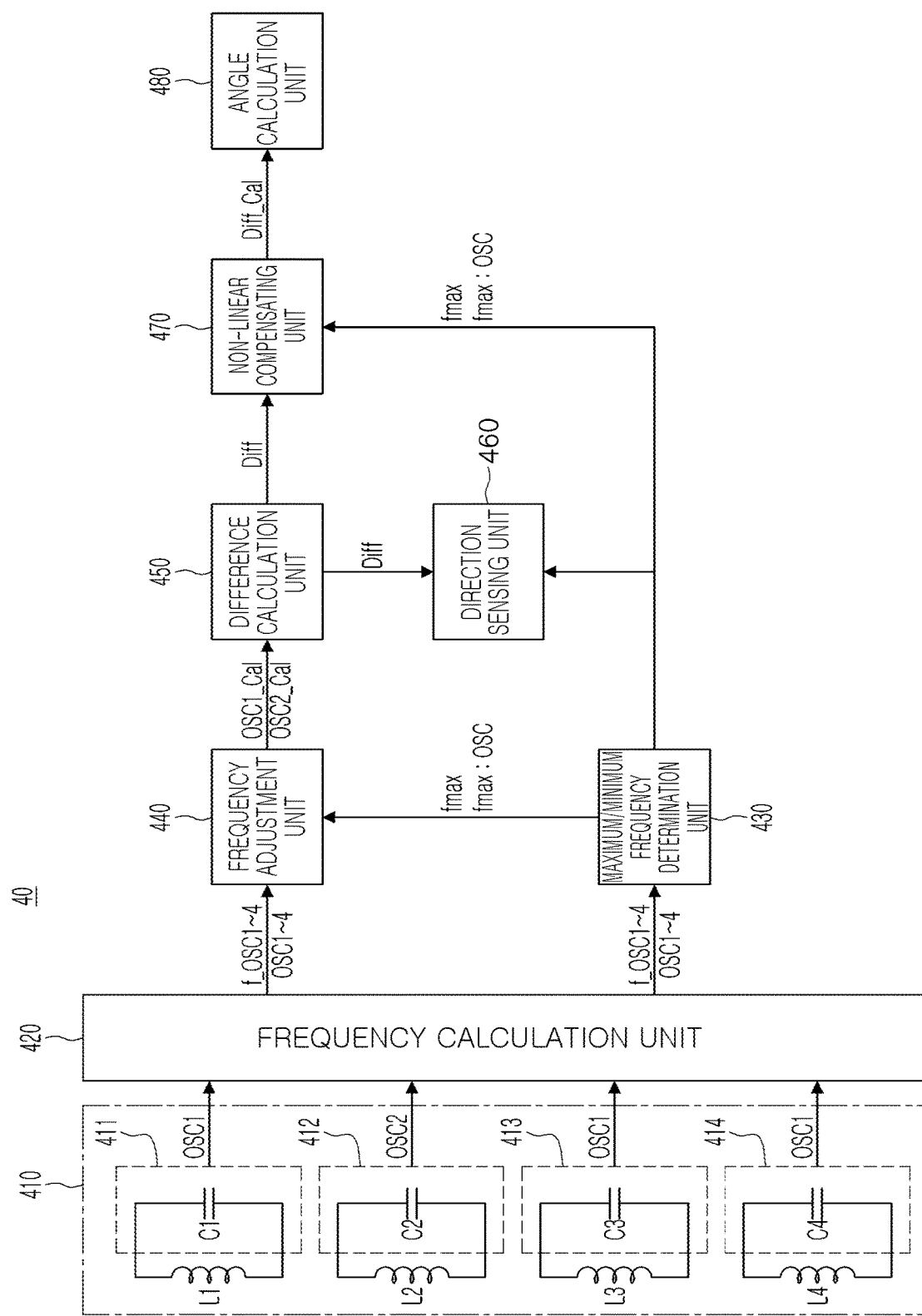
FIG. 5A is a block diagram of an example of a rotation information calculation circuit.
Figure 5B:
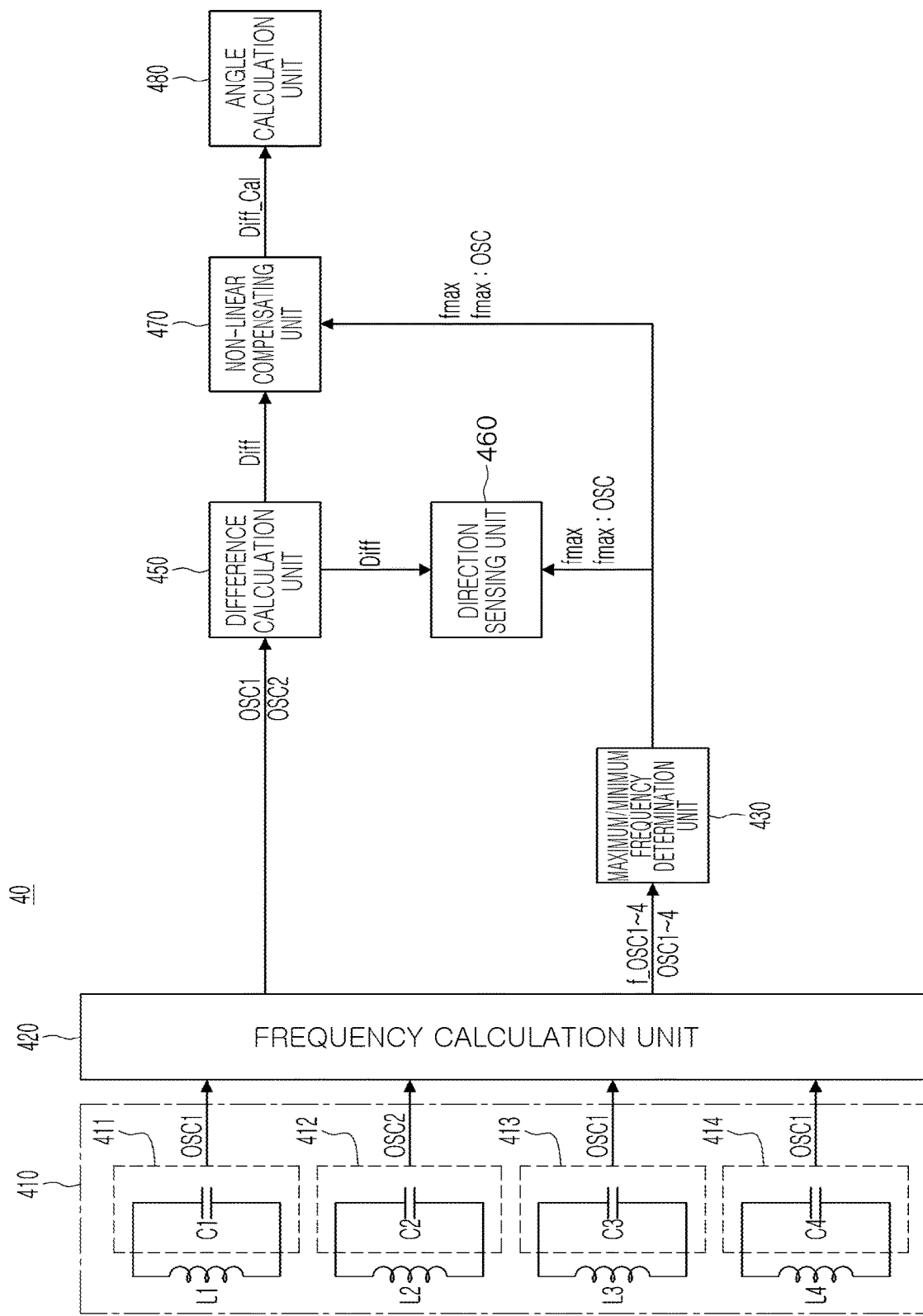
FIG. 5B is a block diagram of an example of a rotation information calculation circuit.

FIG. 5A may be a block diagram of an example of a rotation information calculation circuit. FIG. 5B may be a block diagram of another example of a rotation information calculation circuit.

Referring to FIG. 5A, a method of detecting a rotating body of a rotation sensing apparatus according to an example of the present disclosure will be described in detail.

A rotation information calculation circuit 40 according to an example of the present disclosure may include an oscillation unit 410, a frequency calculation unit 420, a maximum/minimum frequency determination unit 430, a frequency adjustment unit 440, a difference calculation unit 450, a direction sensing unit 460, a non-linear compensating unit 470, and an angle calculation unit 480.

The oscillation unit 410 may include a plurality of oscillation signal generators. The plurality of oscillation signal generators may include a first oscillation signal generator 411, a second oscillation signal generator 412, a third oscillation signal generator 413, and a fourth oscillation signal generator 414.

The first oscillation signal generator 411 may include a first sensing coil L1 of the first sensor 31 and a first capacitor C1 forming a first oscillation circuit. The second oscillation signal generator 412 may include a second sensing coil L2 of the second sensor 32 and a second capacitor C2 forming a second oscillation circuit. In addition, the third oscillation signal generator 413 may include a third sensing coil L3 of the third sensor 33 and a third capacitor C3 forming a third oscillation circuit. The fourth oscillation signal generator 414 may include a fourth sensing coil L4 of the fourth sensor 34 and a fourth capacitor C4 forming a fourth oscillation circuit.

One pair of sensing coils and capacitors may constitute an LC oscillator. A plurality of oscillation circuits included in the oscillation unit 410 may be schematically illustrated, and the first to fourth oscillation circuits may be configured in various forms of oscillators known in the art. The first oscillation signal generator 411 may output a first oscillation signal OSC1, the second oscillation signal generator 412 may output a second oscillation signal OSC2, the third oscillation signal generator 413 may output a third oscillation signal OSC3, and the fourth oscillation signal generator 414 may output a fourth oscillation signal OSC4.

When the overlapped area of the detected part 20 with the first sensing coil L1, the second sensing coil L2, the third sensing coil L3 and the fourth sensing coil L4 is changed by rotation of the wheel 10, frequency of the oscillation signal output from the first oscillation signal generator 411, the second oscillation signal generator 412, the third oscillation signal generator 413 and the fourth oscillation signal generator 414 may be changed. In the above description, although the first sensor 31, the second sensor 32, the third sensor 33 and the fourth sensor 34 respectively form an oscillation circuit and a capacitor to output an oscillation signal, the oscillation signal may correspond to an example of a sensing signal output from the first sensor 31, the second sensor 32, the third sensor 33 and the fourth sensor 34. Therefore, the first sensor 31, the second sensor 32, the third sensor 33, and the fourth sensor 34 may be combined with various devices to generate various sensing signals. For convenience of explanation, a case in which the first sensor 31, the second sensor 32, the third sensor 33, and the fourth sensor 34 respectively form a capacitor and an oscillation circuit to output an oscillation signal will be described as an example.

The frequency calculation unit 420 may calculate frequencies of the first oscillation signal OSC1, the second oscillation signal OSC2, the third oscillation signal OSC3 and the fourth oscillation signal OSC4 provided from the oscillation unit 410. The frequency calculation unit 420 may count the frequencies of the first oscillation signal OSC1, the second oscillation signal OSC2, the third oscillation signal OSC3 and the fourth oscillation signal OSC4, to calculate a frequency f_OSC1 of the first oscillation signal OSC1, a frequency f_OSC2 of the second oscillation signal OSC2, a frequency f_OSC3 of the third oscillation signal OSC3 and a frequency f_OSC4 of the fourth oscillation signal OSC4.

The frequency calculation unit 420 may provide the frequency f_OSC1 of the first oscillation signal OSC1, the frequency f_OSC2 of the second oscillation signal OSC2, the frequency f_OSC3 of the third oscillation signal OSC3, and the frequency f_OSC4 of the fourth oscillator OSC4, together with the first oscillation signal OSC1, the second oscillation signal OSC2, the third oscillation signal OSC3 and the fourth oscillation signal OSC4, to respective configurations as well as to the maximum/minimum frequency determination unit 430 and the frequency adjustment unit 440.

The maximum/minimum frequency determination unit 430 may receive the frequency f_OSC1 of the first oscillation signal OSC1, the frequency f_OSC2 of the second oscillation signal OSC2, the frequency f_OSC3 of the third oscillation signal OSC3, and the frequency f_OSC4 of the fourth oscillation signal OSC4 provided from the frequency calculation unit 420, to determine a maximum frequency fmax and a minimum frequency fmin for each time period. The maximum/minimum frequency determination unit 430 may determine an oscillation signal fmax:OSC corresponding to one of the maximum frequency fmax and the minimum frequency fmin.

The maximum/minimum frequency determination unit 430 may receive the first oscillation signal OSC1, the second oscillation signal OSC2, the third oscillation signal OSC3, and the fourth oscillation signal OSC4, which may be generated in real time, and information regarding frequencies thereof. The maximum/minimum frequency determination unit 430 may determine the maximum frequency fmax and the minimum frequency fmin for each timing or each time period, using the received oscillation signals and the frequency information thereof.

Hereinafter, for convenience of explanation, the operation of the rotation information calculation circuit will be described mainly with the maximum frequency fmax. The following description may also be applied to the minimum frequency fmin.

Figure 6:
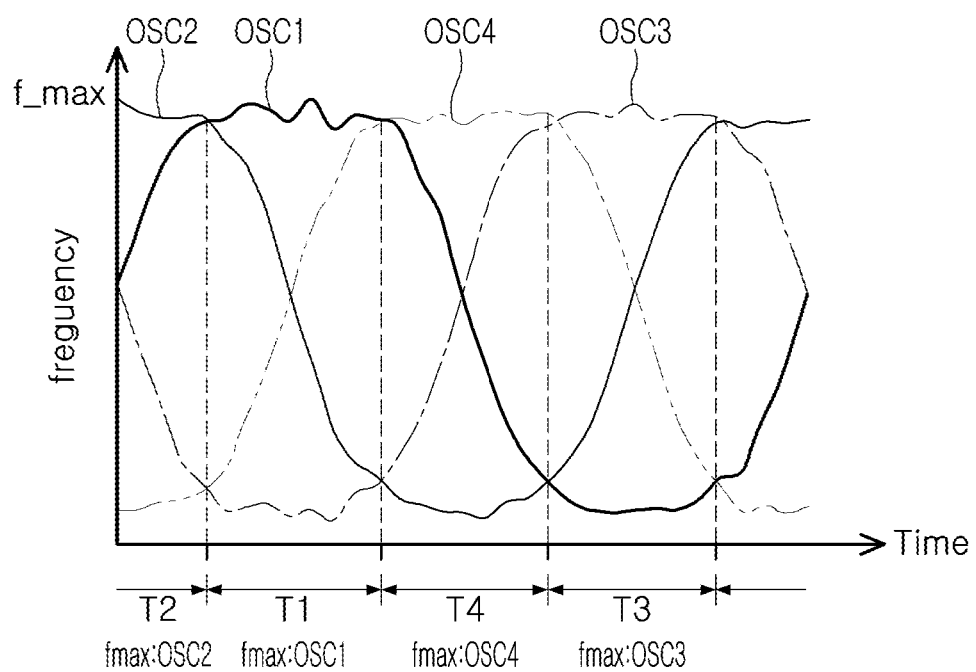
FIG. 6 provides a simulation graph of an example of a first oscillation signal, a second oscillation signal, a third oscillation signal, and a fourth oscillation signal.

FIG. 6 provides a simulation graph of an example of a first oscillation signal, a second oscillation signal, a third oscillation signal, and a fourth oscillation signal.

When the first oscillation signal OSC1, the second oscillation signal OSC2, the third oscillation signal OSC3 and the fourth oscillation signal OSC4 having frequencies illustrated in FIG. 6 are provided, the maximum/minimum frequency determination unit 430 may calculate the maximum frequency fmax for each time period.

Also, the maximum/minimum frequency determination unit 430 may determine an oscillation signal corresponding to the calculated maximum frequency. For example, the maximum/minimum frequency determination unit 430 may determine the first oscillation signal OSC1 as an oscillation signal fmax:OSC1 corresponding to a maximum frequency in a first interval T1, may determine the second oscillation signal OSC2 as an oscillation signal fmax:OSC2 corresponding to a maximum frequency in a second interval T2, may determine the third oscillation signal OSC3 as an oscillation signal fmax:OSC3 corresponding to a maximum frequency in a third interval T3, and may determine the fourth oscillation signal OSC4 as an oscillation signal fmax:OSC4 corresponding to a maximum frequency in a fourth interval T4.

Figure 7:
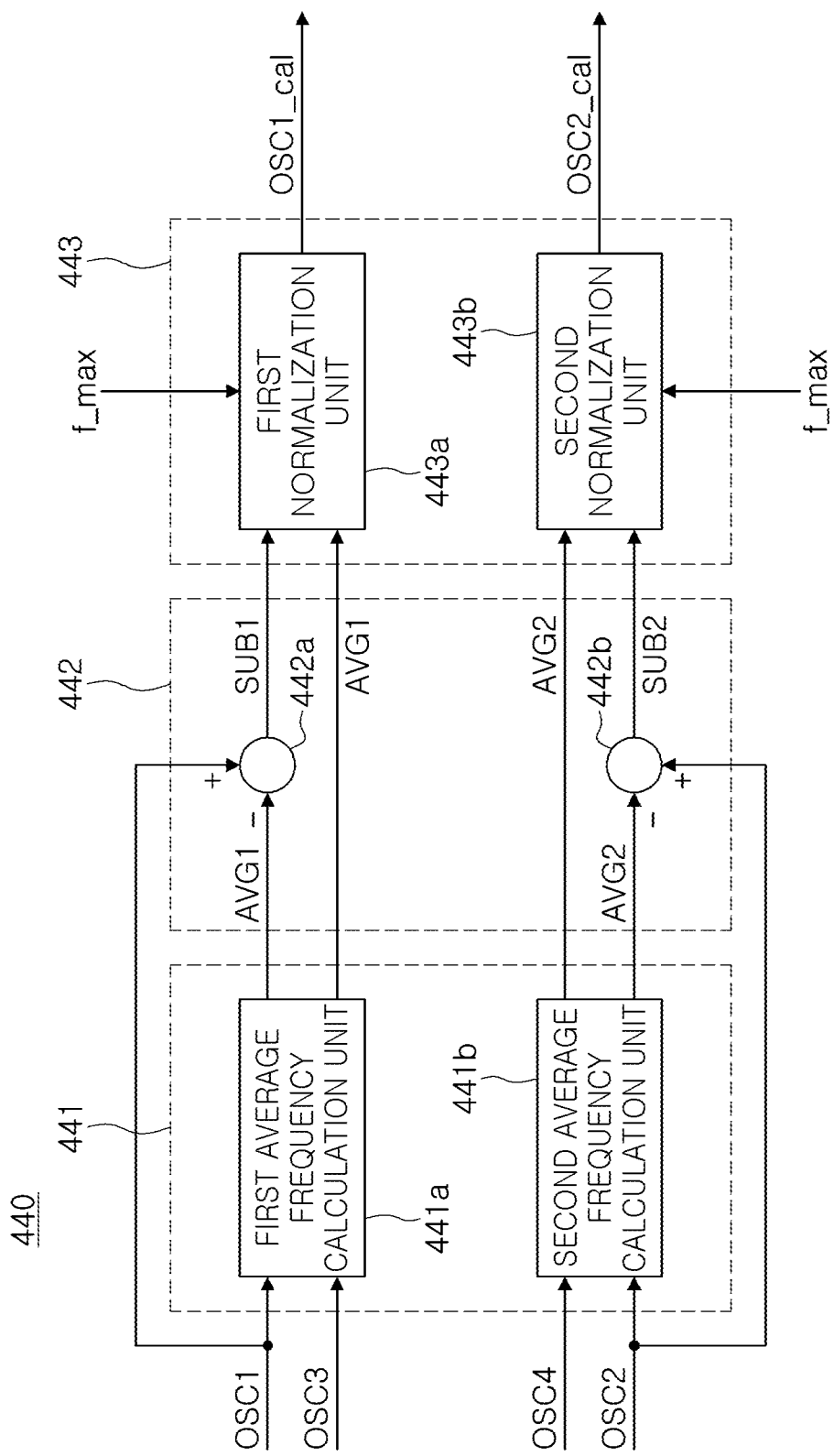
FIG. 7 is a block diagram of an example of a frequency adjustment unit.
Figure 8A:
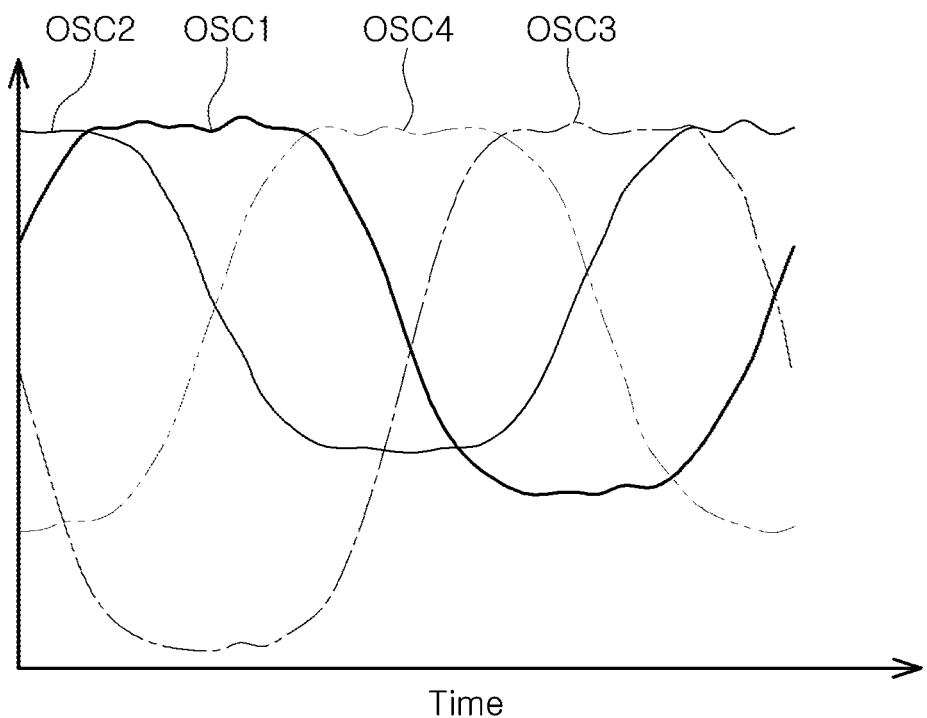
FIG. 8A is a simulation graph of an example of an oscillation signal when a detected part deviates from a neutral position.
Figure 8B:
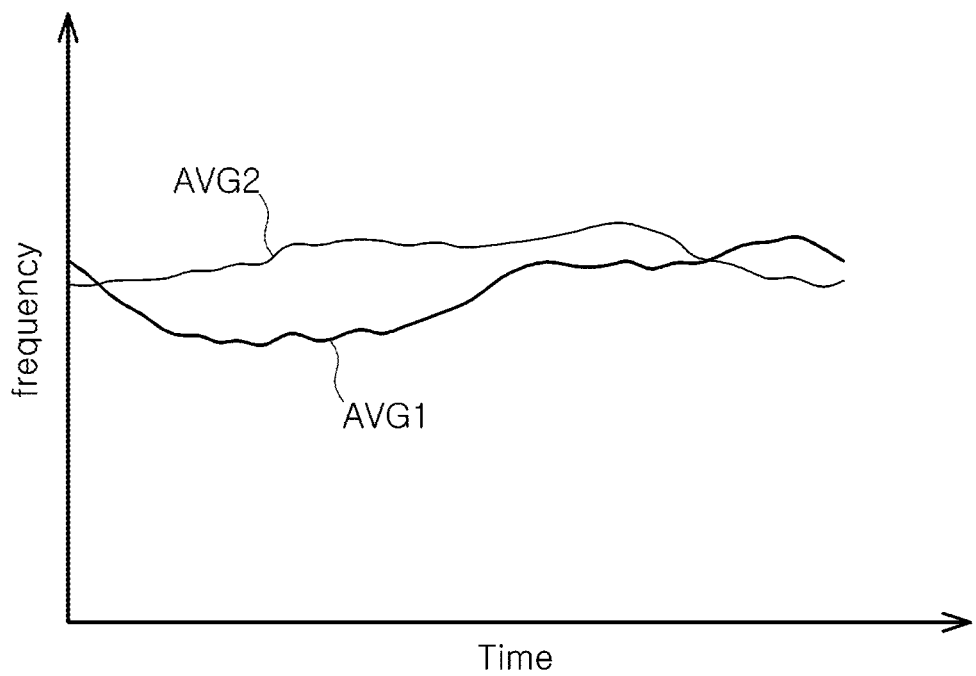
FIG. 8B is a simulation graph of an example of an average signal.
Figure 8C:
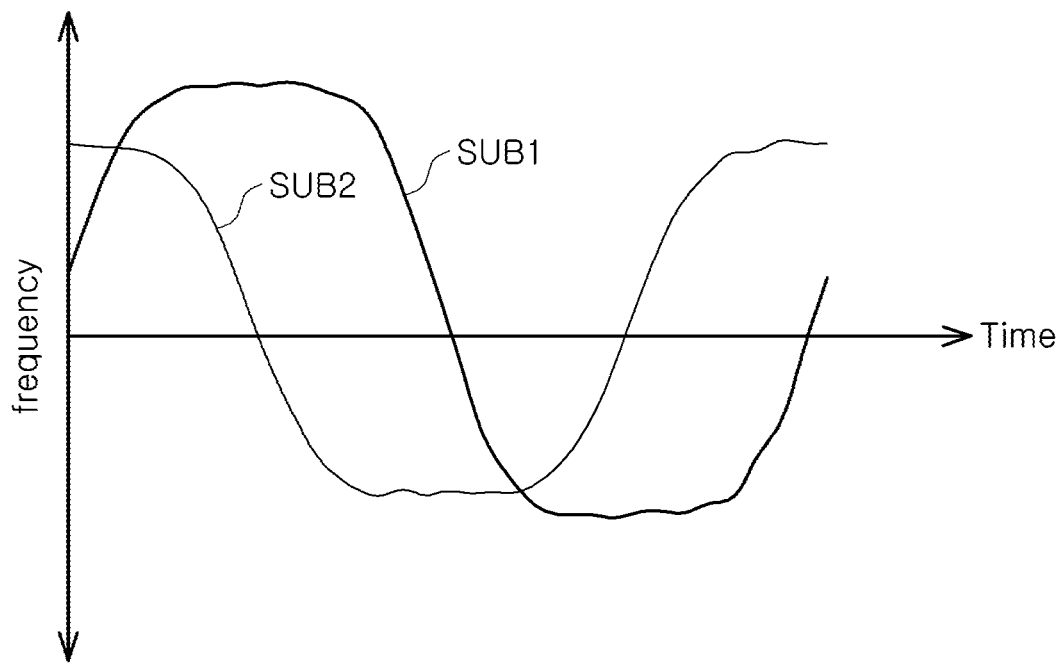
FIG. 8C is a simulation graph of an example of a subtraction signal.
Figure 8D:
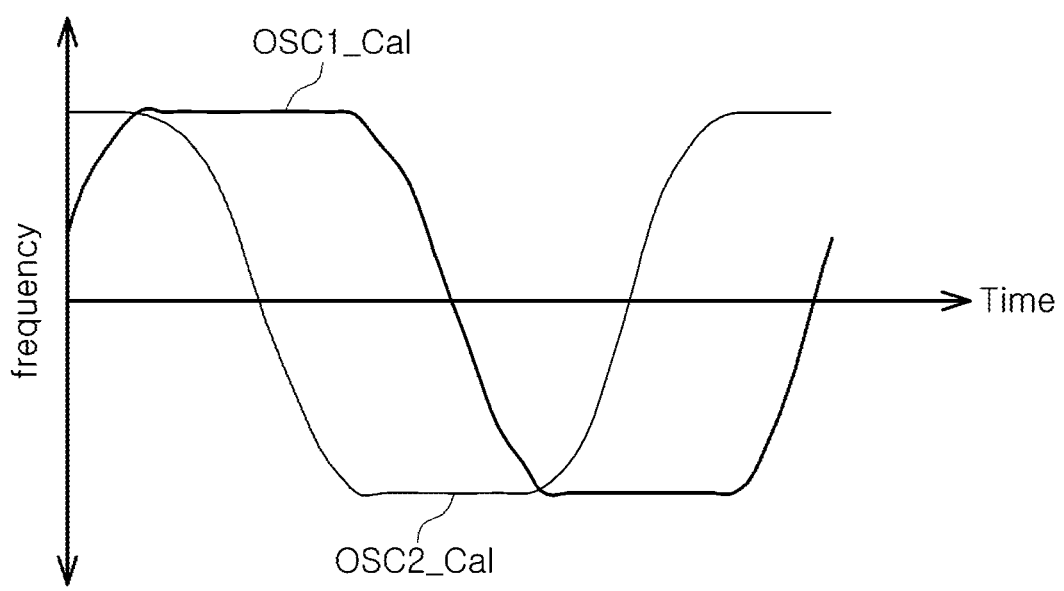
FIG. 8D is a simulation graph of an example of an adjustment signal.

FIG. 7 is a block diagram of an example of a frequency adjustment unit. FIG. 8A is a simulation graph of an example of an oscillation signal when a detected part deviates from a neutral position. FIG. 8B is a simulation graph of an example of an average signal. FIG. 8C is a simulation graph of an example of a subtraction signal. FIG. 8D is a simulation graph of an example of an adjustment signal.

In an example in which a user operates the wheel, the detected part may deviate from a horizontal or vertical neutral position by the force in an unintended direction, different from the force in the rotation direction. Referring to FIG. 8A, in the case in which the detected part deviates from the horizontal or vertical neutral position, frequencies of the first oscillation signal OSC1, the second oscillation signal OSC2, the third oscillation signal OSC3 and the fourth oscillation signal OSC4 may vary unevenly, and sensing sensitivity of the rotation sensing apparatus may be deteriorated. Therefore, in the case in which the detected part deviates from the horizontal or vertical neutral position, it is necessary to compensate for the decreased sensing sensitivity of the rotation sensing apparatus.

The frequency adjustment unit 440 according to an example of the present disclosure may generate a first adjustment signal OSC1_cal and a second adjustment signal OSC2_cal in response to the first oscillation signal OSC1, the second oscillation signal OSC2, the third oscillation signal OSC3 and the fourth oscillation signal OSC4, and may calculate rotation information in response to the generated first adjustment signal OSC1_cal and second adjustment signal OSC2_cal, thereby improving sensing sensitivity.

The frequency adjustment unit 440 according to an example of the present disclosure may include an average signal generator 441, a subtractor 442, and a normal signal generator 443.

The average signal generator 441 may include a first average frequency calculation unit 441a, and a second average frequency calculation unit 441b. Referring to FIG. 8B, the first average frequency calculation unit 441a may average the first oscillation signal OSC1 and the second oscillation signal OSC2 according to the frequency f_OSC1 of the first oscillation signal OSC1 and the frequency f_OSC3 of the third oscillation signal OSC3, to generate a first average signal AVG1. The second average frequency calculation unit 441b may average the second oscillation signal OSC2 and the fourth oscillation signal OSC4 according to the frequency f_OSC2 of the second oscillation signal OSC2 and the frequency f_OSC4 of the fourth oscillation signal OSC4, to generate a second average signal AVG2. The first average signal AVG1 and the second average signal AVG2 illustrated in FIG. 8B may be generated by the average signal generator 441.

The subtractor 442 may include a first subtractor 442a and a second subtractor 442b.

The first subtractor 442a may subtract the first average signal AVG1 from the first oscillation signal OSC1 to generate a first subtraction signal SUB1. For example, the first subtraction signal SUB1 may be generated by subtracting a frequency f_AVG1 of the first average signal AVG1 from the frequency f_OSC1 of the first oscillation signal OSC1.

The second subtractor 442b may subtract the second average signal AVG2 from the second oscillation signal OSC2 to generate a second subtraction signal SUB2. For example, the second subtraction signal SUB2 may be generated by subtracting a frequency f_AVG2 of the second average signal AVG2 from the frequency f_OSC2 of the second oscillation signal OSC2. The subtractor 442 may generate the first subtraction signal SUB1 and the second subtraction signal SUB2 illustrated in FIG. 8C.

According to an example of the present disclosure, the first subtractor 442a may subtract the first average signal AVG1 from the third oscillation signal OSC3, and the second subtractor 442b may subtract the second average signal AVG2 from the fourth oscillation signal OSC4. For convenience of explanation, a case in which the first subtractor 442a subtracts the first average signal AVG1 from the first oscillation signal OSC1, and the second subtractor 442b subtracts the second average value AVG2 from the second oscillation signal OSC2, will be described as an example.

The normal signal generator 443 may include a first normalization unit 443a and a second normalization unit 443b.

The first normalization unit 443a may normalize the first subtraction signal SUB1 to generate the first adjustment signal OSC1_cal. The first normalization unit 443a may normalize the first subtraction signal SUB1 by the first average signal AVG1 and the maximum frequency fmax. For example, the first normalization unit 443a may calculate the frequency f_OSC1_cal of the first adjustment signal OSC1_cal, by a ratio of frequency f_SUB1 of the first subtraction signal SUB1 with respect to a difference between the maximum frequency fmax and the frequency f_AVG1 of the first average signal AVG1, based on the following equation 1, to generate the first adjustment signal OSC1_cal.

$$f\_OSC1\_cal = \frac{f\_SUB1}{f\_MAX - f\_AVG1} \qquad \text{Equation 1}$$

The second normalization unit 443b may normalize the second subtraction signal SUB2 to generate the second adjustment signal OSC2_cal. The second normalization unit 443b may normalize the second subtraction signal SUB2 according to the second average signal AVG2 and the maximum frequency fmax. For example, the second normalization unit 443b may calculate the frequency f_OSC2_cal of the second adjustment signal OSC2_cal, by a ratio of frequency f_SUB2 of the second subtraction signal SUB2 with respect to a difference between the maximum frequency fmax and the frequency f_AVG2 of the second average signal AVG2, based on the following equation 2, to generate the second adjustment signal OSC2_cal.

$$f\_OSC2\_cal = \frac{f\_SUB2}{f\_MAX - f\_AVG2} \qquad \text{Equation 2}$$

The first adjustment signal OSC1_cal and the second adjustment signal OSC2_cal illustrated in FIG. 8D may be generated by the normal signal generator 443.

Comparing FIGS. 8A and 8D, the first oscillation signal OSC1 and the second oscillation signal OSC2 have a non-uniform frequency by the detected part deviating from the neutral position, while the first adjustment signal OSC1_cal and the second adjustment signal OSC2_cal have a uniform frequency range. Therefore, the rotation sensing apparatus according to an example of the present disclosure may accurately calculate the rotation information of the rotating body even in the case in which the detected part deviates from the neutral position.

Referring again to FIG. 5A, the difference calculation unit 450 may calculate a differential signal Diff by calculating a difference between the first adjustment signal OSC1_cal and the second adjustment signal OSC2_cal.

Figure 9:
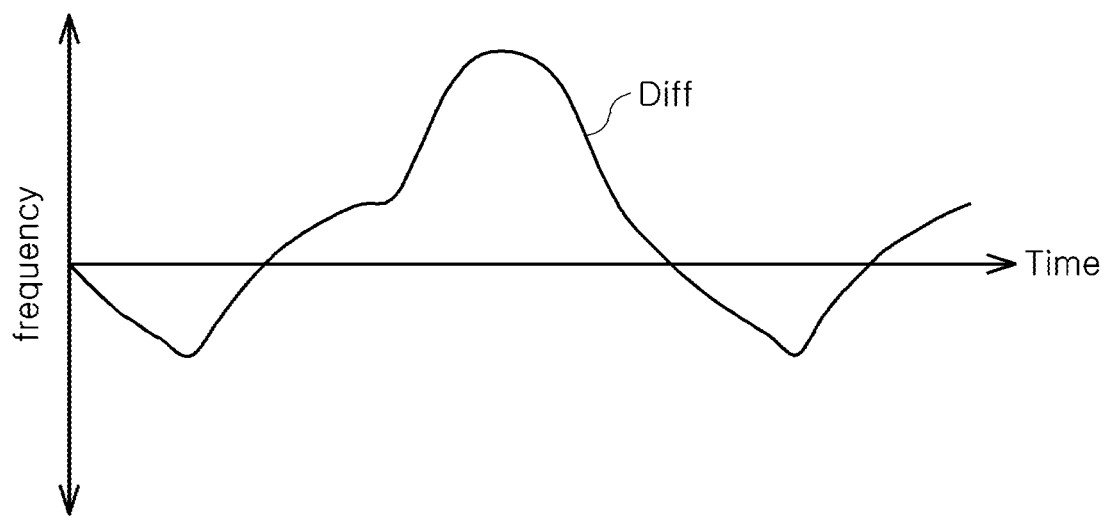
FIG. 9 is a simulation graph of an example of a differential signal.

FIG. 9 is a simulation graph of an example of a differential signal.

Referring to FIG. 9, the difference calculation unit 450 may generate a differential signal Diff, rised or fallen according to a time period, by subtracting the first adjustment signal OSC1_cal and the second adjustment signal OSC2_cal.

Referring to FIG. 5B, the frequency adjustment unit 440 of the rotation information calculation circuit 40 according to the example of FIG. 5A may be omitted. In the example in which the frequency adjustment unit 440 may be omitted, the first oscillation signal OSC1 and the second oscillation signal OSC2 may be provided to the difference calculation unit 450, instead of the first adjustment signal OSC1_cal and the second adjustment signal OSC2_cal; therefore, the differential signal Diff may be generated by the difference between the first oscillation signal OSC1 and the second oscillation signal OSC2.

Figure 10A:
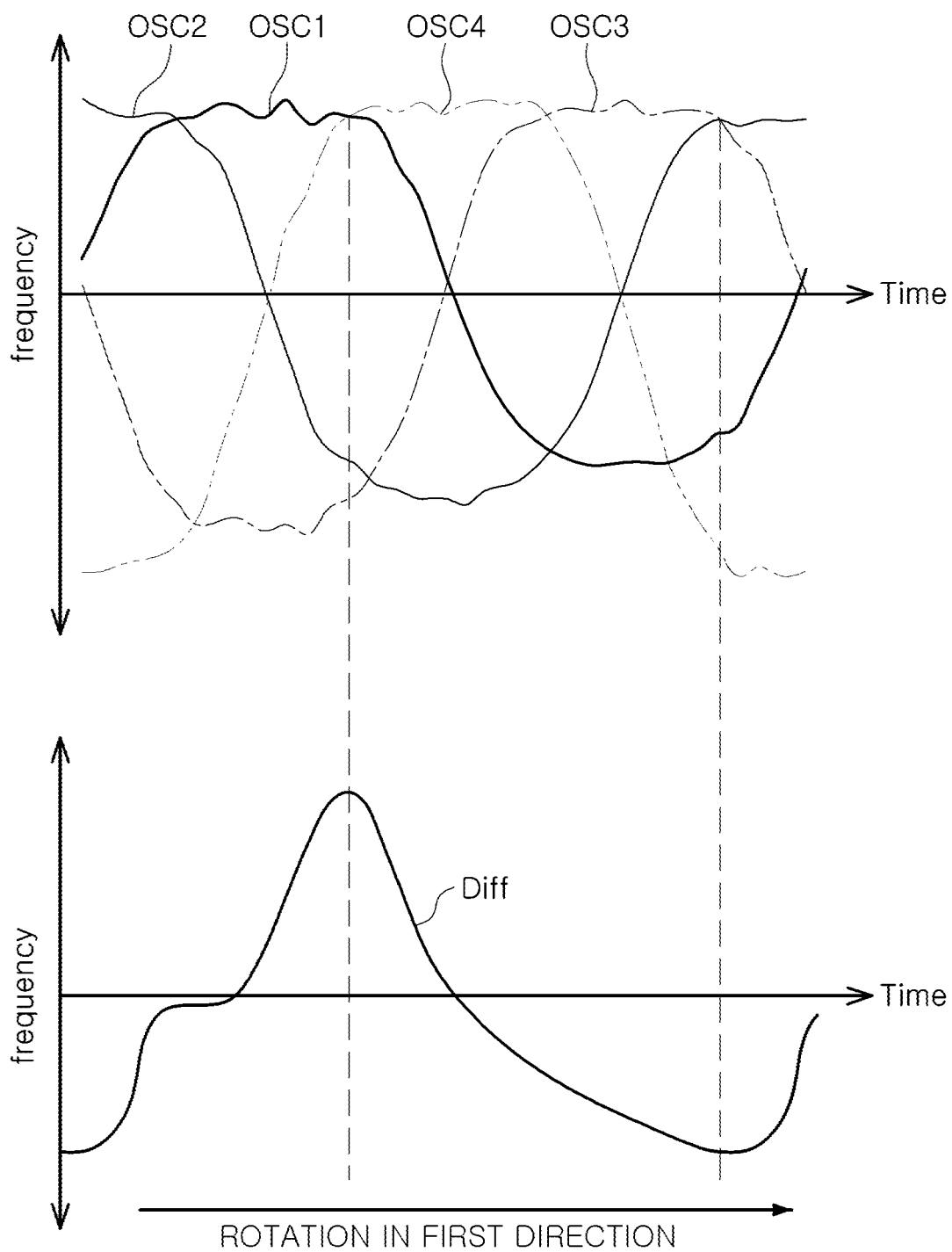
FIG. 10A provides simulation graphs of an example of a first oscillation signal, a second oscillation signal, a third oscillation signal, a fourth oscillation signal, and a differential signal, when a rotating body rotates in a first direction.
Figure 10B:
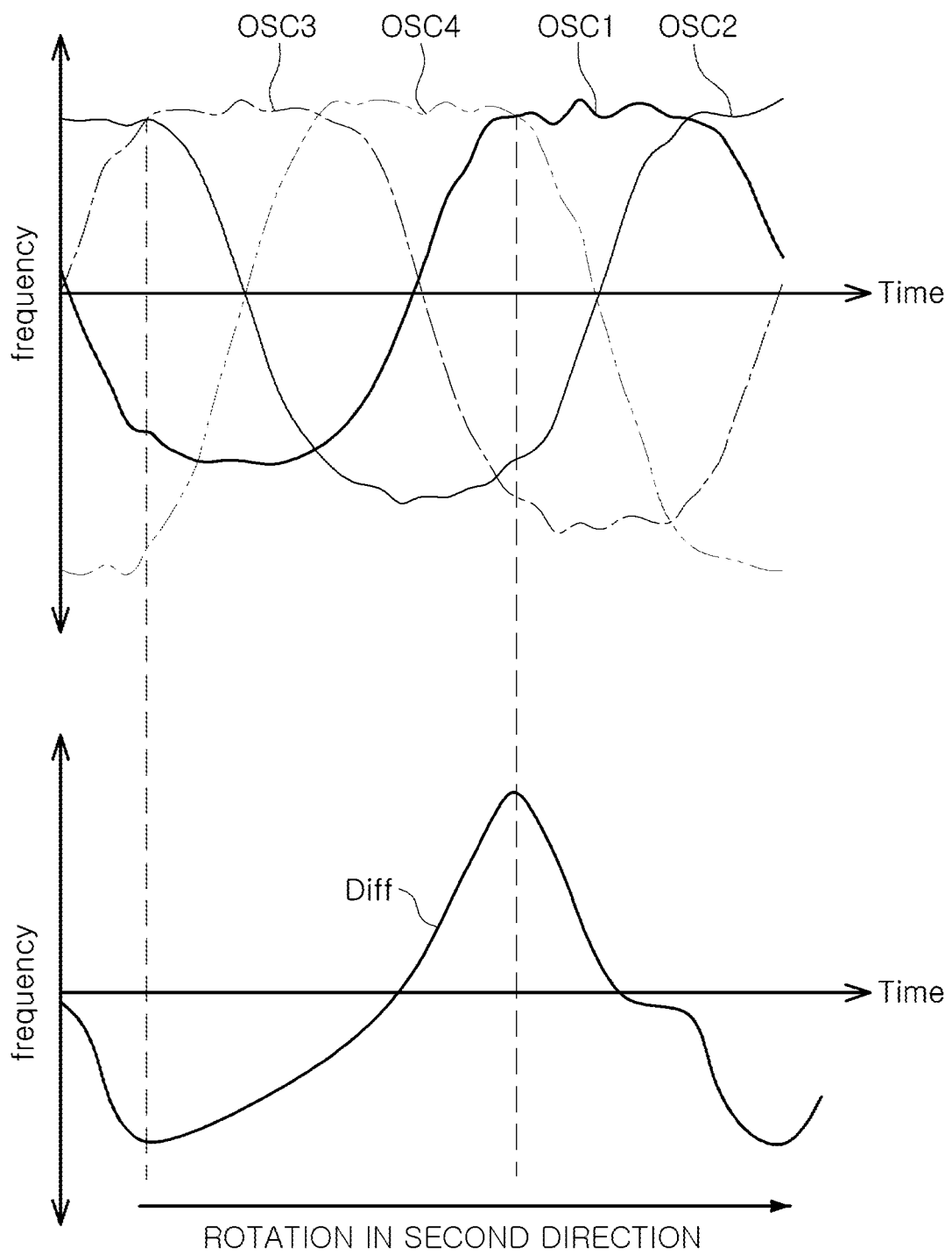
FIG. 10B provides simulation graphs of an example of a first oscillation signal, a second oscillation signal, a third oscillation signal, a fourth oscillation signal, and a differential signal, when a rotating body rotates in a second direction.

FIG. 10A provides simulation graphs illustrating an example of a first oscillation signal OSC1, a second oscillation signal OSC2, a third oscillation signal OSC3, a fourth oscillation signal OSC4, and a differential signal Diff, when a rotating body rotates in a first direction. FIG. 10B provides simulation graphs illustrating an example of a first oscillation signal OSC1, a second oscillation signal OSC2, a third oscillation signal OSC3, a fourth oscillation signal OSC4 and a differential signal Diff, when a rotating body rotates in a second direction.

The direction sensing unit 460 may sense a rotation direction of the rotating body according to the interval of the oscillation signal corresponding to the maximum frequency and the rising or falling differential signal Diff.

Referring to FIG. 10A, when the rotating body rotates in the first direction, and in an example in which the first oscillation signal OSC1 or the second oscillation signal OSC2 has a maximum frequency, the differential signal Diff may rise. Further, when the rotating body rotates in the first direction and the third oscillation signal OSC3 or the fourth oscillation signal OSC4 has a maximum frequency, the differential signal Diff may fall.

When the rotating body rotates in the second direction different from the first direction and the first oscillation signal OSC1 or the second oscillation signal OSC2 has a maximum frequency, the differential signal Diff may fall. Further, when the rotating body rotates in the second direction and the third oscillation signal OSC3 or the fourth oscillation signal OSC4 has a maximum frequency, the differential signal Diff may rise.

Therefore, for example, when the first oscillation signal OSC1 or the second oscillation signal OSC2 corresponds to the maximum frequency and the differential signal Diff rises, the direction sensing unit 460 may determine that the rotating body rotates in the first direction. When the third oscillation signal OSC3 or the fourth oscillation signal OSC4 corresponds to the maximum frequency and the differential signal Diff falls, the direction sensing unit 460 may determine that the rotating body rotates in the first direction.

Alternatively, when the first oscillation signal OSC1 or the second oscillation signal OSC2 corresponds to the maximum frequency and the differential signal Diff falls, the direction sensing unit 460 may determine that the rotating body rotates in the second direction different from the first direction. When the third oscillation signal OSC3 or the fourth oscillation signal OSC4 corresponds to the maximum frequency and the differential signal Diff rises, the direction sensing unit 460 may determine that the rotating body rotates in the second direction.

The non-linear compensating unit 470 may compensate for non-linearity of the differential signal Diff in response to the oscillation signal having a maximum frequency.

When the first oscillation signal OSC1 or the second oscillation signal OSC2 has a maximum frequency, the differential signal Diff may have a first non-linearity. Referring to FIG. 10A, when the first oscillation signal OSC1 or the second oscillation signal OSC2 has a maximum frequency, the differential signal Diff may have the first non-linearity that substantially rises in a stepwise manner. Referring to FIG. 10B, when the first oscillation signal OSC1 or the second oscillation signal OSC2 has a maximum frequency, the differential signal Diff may have a first non-linearity that falls substantially in a stepwise manner.

When the third oscillation signal OSC3 or the fourth oscillation signal OSC4 has a maximum frequency, the differential signal Diff may have a second non-linearity. Referring to FIG. 10A, when the third oscillation signal OSC3 or the fourth oscillation signal OSC4 has a maximum frequency, the differential signal Diff may have a second non-linearity that substantially decreases exponentially. Referring to FIG. 10B, when the third oscillation signal OSC3 or the fourth oscillation signal OSC4 has a maximum frequency, the differential signal Diff may have a second non-linearity that substantially increases exponentially. The first non-linearity and the second non-linearity may be caused by a process error of an angle, a position, and a size of a sensor provided in the sensor unit 30 and a pattern portion provided in the detected part 20, and by a process error due to a tilt of the rotary shaft. In this case, the process error may be understood as a difference between a design value and an actual measurement value. Even in an example in which a compensation algorithm and a compensation parameter for compensating for the first non-linearity and the second non-linearity may be obtained by graphing the first non-linearity and the second non-linearity of the differential signal Diff in advance, it may be required to determine whether the differential signal has any non-linearity among the first non-linearity and the second non-linearity in increase and decrease intervals to apply the compensation algorithm and the compensation parameter.

The non-linear compensating unit 470 according to an example of the present disclosure may determine the non-linearity of the differential signal Diff by an oscillation signal having a maximum frequency.

The non-linear compensating unit 470 may determine that the differential signal Diff has the first non-linearity in the case in which the first oscillation signal OSC1 or the second oscillation signal OSC2 has the maximum frequency, and may apply a first compensation algorithm, compensating for the first non-linearity, to the differential signal Diff.

When the third oscillation signal OSC3 or the fourth oscillation signal OSC4 has the maximum frequency, the non-linear compensating unit 470 may determine that the differential signal Diff has the second non-linearity, and may apply a second compensation algorithm, compensating for the second non-linearity, to the differential signal Diff.

Figure 11A:
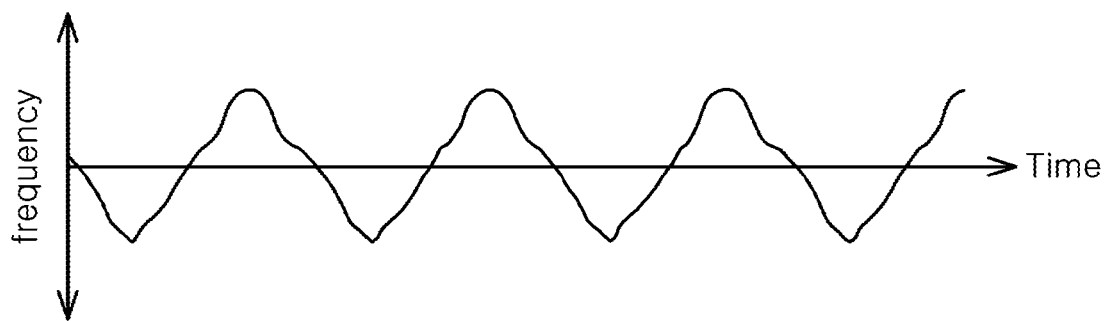
FIGS. 11A and 11B are simulation graphs of an example of a differential signal before and after applying a compensation algorithm.
Figure 11B:
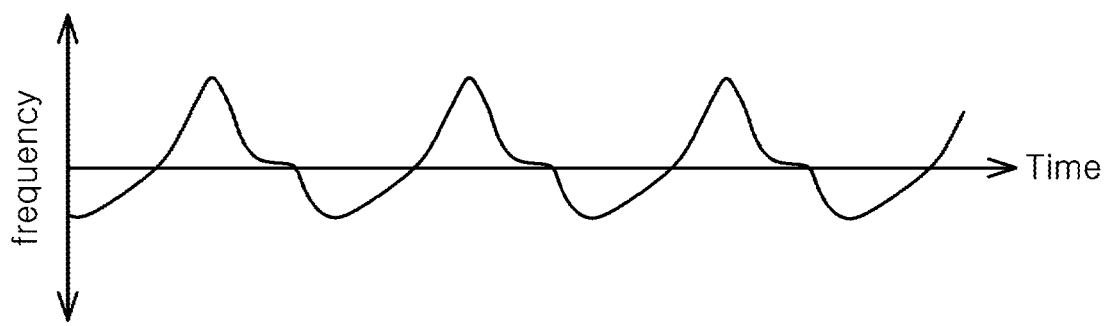

FIGS. 11A and 11B are simulation graphs of an example of a differential signal before and after applying a compensation algorithm.

FIG. 11A is a simulation graph of a differential signal after applying the compensation algorithm, and FIG. 11B is a simulation graph of a differential signal before applying the compensation algorithm.

Comparing FIGS. 11A and 11B, compared with a differential signal of FIG. 11B having the first non-linearity that decreases substantially stepwise and the second non-linearity that increases substantially exponentially, a differential signal of FIG. 11A shows that the non-linearity may be alleviated and linearly increases or decreases over time.

Figure 12:
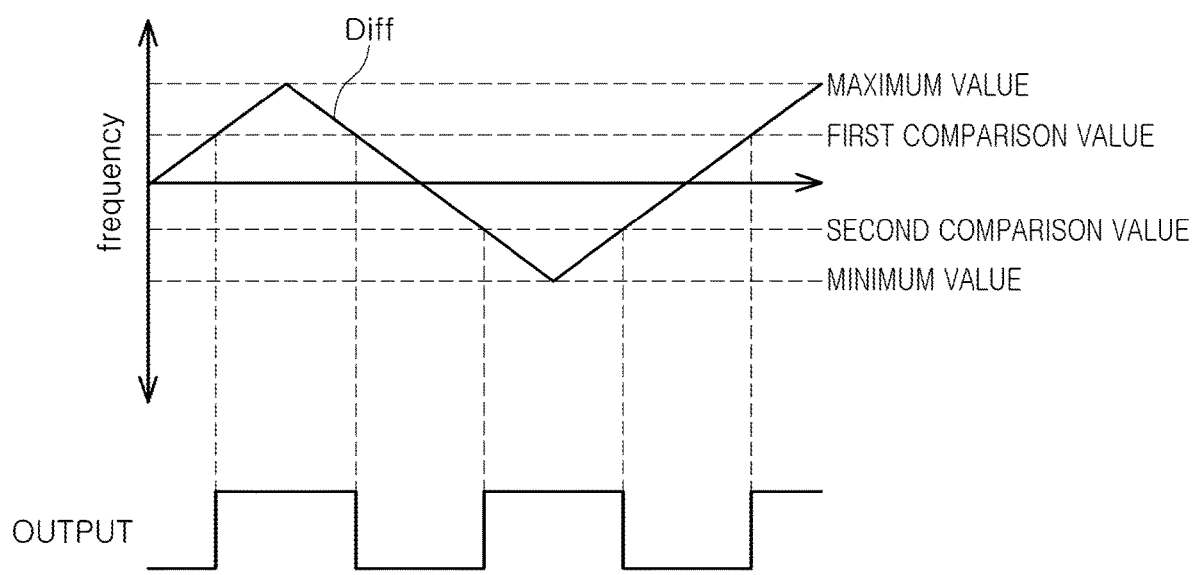
FIG. 12 is an example of a diagram illustrating an angle calculating operation of an angle calculation unit.

FIG. 12 is a diagram illustrating an example of an angle calculating operation of an angle calculation unit.

Referring to FIGS. 5A and 12, the angle calculation unit 480 may calculate a target sensing angle and a plurality of comparison values according to the size of the first pattern and the second pattern, and may calculate a rotation angle by comparing the plurality of calculated comparison values with the differential signal.

According to an example of the present disclosure, even when the target sensing angle may be changed or the size of the sensing coil/pattern may be changed, a plurality of comparison values may be calculated according to the determined target sensing angle and the size of the sensing coil/pattern, and the target sensing angle may be precisely detected by comparing the differential signal with the calculated comparison value.

The plurality of comparison values may be provided within a range between a maximum value Max and a minimum value Min of the differential signal Diff. Differences between adjacent comparison values from among the plurality of comparison values may be all the same as each other; a difference between a maximum comparison value among the plurality of comparison values and the maximum value Max of the differential signal Diff may correspond to twice the difference between adjacent comparison values among the plurality of comparison values; and a difference between a minimum comparison value among the plurality of comparison values and the minimum value Min of the differential signal Diff may correspond to twice the difference between adjacent comparison values among the plurality of comparison values.

Referring to FIG. 12, although two comparison values may be provided, the two comparison values may be illustrative, and the number of comparison values may be determined by the target sensing angle and the size of the pattern.

The plurality of comparison values may be determined depending on the target sensing angle and the size of the first pattern and the second pattern. The number of the plurality of comparison values may be determined by the ratio of the angle corresponding to the sizes of the first pattern and the second pattern and the target sensing angle, and levels of the plurality of comparison values may be determined to divide the angle corresponding to the sizes of the first pattern and the second pattern by the target sensing angle.

When the size of the pattern corresponds to 90 degrees, and the target sensing angle is 7.5 degrees, 12(=90/7.5)-number comparison values may be calculated. By the twelve comparison values, 90 degrees corresponding to the pattern size may be evenly divided by 7.5 degrees corresponding to the target sensing angle.

In addition, when the pattern size corresponds to 45 degrees and the target sensing angle may be 7.5 degrees, 6(=45/7.5)-number comparison values may be calculated. By the six comparison values, 45 degrees corresponding to the pattern size may be evenly divided by 7.5 degrees corresponding to the target sensing angle.

In addition, when the pattern size corresponds to 15 degrees and the target sensing angle may be 7.5 degrees, 2(=15/7.5)-number comparison values may be calculated. By the two comparison values, 15 degrees, corresponding to the pattern size, may be evenly divided by 7.5 degrees, corresponding to the target sensing angle.

The angle calculation unit 480 may generate an output value OUTPUT by comparing the differential signal Diff and the plurality of comparison values. The angle calculation unit 480 may calculate the output value OUTPUT by switching the state of the output value OUTPUT at the time that the level of the differential signal Diff may be equal to the level of each of the first comparison value and the second comparison value.

In the case in which two comparison values, a first comparison value and a second comparison value, are provided from the angle calculation unit 480 and in which the output value OUTPUT has a low level before comparison with the first comparison value, the angle calculation unit 480 may determine the differential signal Diff equal to or greater than the first comparison value to be the high level, the differential signal Diff less than the second comparison value to be the high level, and the differential signal Diff that may be lower than the first comparison value and equal to or greater than the second comparison value, to be a low level, thereby calculating the output value OUTPUT.

The angle calculation unit 480 may calculate the rotation angle of the detected part from each of high-level and low-level interval intervals of the output value OUTPUT. For example, the angle calculation unit 480 may calculate the rotation angle from the interval between the high level and the low level of the output value OUTPUT.

As set forth above, according to various examples, a rotation sensing apparatus may accurately sense a rotation direction of a rotating body.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A rotation sensing apparatus comprising:
   a detected part, configured to rotate in rotation directions, comprising a protruding first pattern portion with a plurality of first pattern members, and a protruding second pattern portion with a plurality of second pattern members;
a sensor unit comprising
a first sensor disposed opposite to the protruding first pattern portion, and a third sensor disposed to be spaced apart from the first sensor in the rotation directions and opposite to the protruding first pattern portion, and
a second sensor disposed opposite to the protruding second pattern portion, and a fourth sensor disposed to be spaced apart from the second sensor in the rotation directions and opposite to the protruding second pattern portion; and
a rotation information calculation circuit configured to calculate rotation information of a rotating body in response to a first oscillation signal, a second oscillation signal, a third oscillation signal, and a fourth oscillation signal generated based on respective outputs of the first sensor, the second sensor, the third sensor, and the fourth sensor,
wherein the rotation information calculation circuit is configured to sense the rotation directions, in response to a differential signal, generated based on the first oscillation signal and the second oscillation signal, and an oscillation signal corresponding to one of a maximum frequency and a minimum frequency, from among the first oscillation signal, the second oscillation signal, the third oscillation signal, and the fourth oscillation signal,
wherein the rotation information calculation circuit is further configured to generate a first average signal by averaging the first oscillation signal and the second oscillation signal, and to generate a second average signal by averaging the third oscillation signal and the fourth oscillation signal, and
wherein the rotation information calculation circuit is further configured to generate a first subtraction signal by subtracting the first average signal from the first oscillation signal, and to generate a second subtraction signal by subtracting the second average signal from the second oscillation signal.

2. The rotation sensing apparatus according to claim 1, wherein the rotation information calculation circuit is further configured to sense the rotation directions, in response to a rising or falling period of the differential signal, and the oscillation signal corresponding to the maximum frequency and the minimum frequency.

3. The rotation sensing apparatus according to claim 2, wherein the rotation information calculation circuit is further configured to determine a rotation direction of the rotation directions as a first direction, upon the oscillation signal corresponding to one of the maximum frequency and the minimum frequency corresponds to one of the first oscillation signal and the second oscillation signal, and the differential signal rises.

4. The rotation sensing apparatus according to claim 3, wherein the rotation information calculation circuit is further configured to determine another rotation direction of the rotation directions as a second direction, corresponding to a direction opposite to the first direction, upon the oscillation signal corresponding to one of the maximum frequency and the minimum frequency corresponds to one of the first oscillation signal and the second oscillation signal, and the differential signal falls.

5. The rotation sensing apparatus according to claim 3, wherein the rotation information calculation circuit is further configured to determine the rotation direction as a second direction, corresponding to a direction opposite to the first direction, upon the oscillation signal corresponding to one of the maximum frequency and the minimum frequency corresponds to one of the third oscillation signal and the fourth oscillation signal, and the differential signal rises.

6. The rotation sensing apparatus according to claim 3, wherein the rotation information calculation circuit is further configured to determine another rotation direction as a first direction, upon the oscillation signal corresponding to one of the maximum frequency and the minimum frequency corresponds to one of the third oscillation signal and the fourth oscillation signal, and the differential signal falls.

7. The rotation sensing apparatus according to claim 1, wherein the first oscillation signal and the third oscillation signal have a phase difference of 180 degrees, and the second oscillation signal and the fourth oscillation signal have a phase difference of 180 degrees.

8. The rotation sensing apparatus according to claim 7, wherein the first oscillation signal and the second oscillation signal have a phase difference of 90 degrees, and the third oscillation signal and the fourth oscillation signal have a phase difference of 90 degrees.

9. The rotation sensing apparatus according to claim 1, wherein the rotation information calculation circuit is further configured to generate a first adjustment signal by a ratio of a frequency of the first subtraction signal to a difference between the maximum frequency and a frequency of the first average signal, and to generate a second adjustment signal by a ratio of a frequency of the second subtraction signal to a difference between the maximum frequency and a frequency of the second average signal.

10. The rotation sensing apparatus according to claim 9, wherein the rotation information calculation circuit is further configured to generate the differential signal by subtracting the second adjustment signal from the first adjustment signal.

11. The rotation sensing apparatus according to claim 1, wherein the rotation information calculation circuit is further configured to generate the differential signal by subtracting the second oscillation signal from the first oscillation signal.

12. The rotation sensing apparatus according to claim 1, wherein the plurality of first pattern members are configured to partially overlap the plurality of second pattern members in an extending direction of a rotary shaft.

13. The rotation sensing apparatus according to claim 12, wherein the first sensor and the second sensor are provided in a first plane, and the third sensor and the fourth sensor are provided in a second plane, having an angular difference from the first plane by a reference angle.

14. The rotation sensing apparatus according to claim 1, wherein the plurality of first pattern members and the plurality of second pattern members are arranged to have a same angular phase.

15. The rotation sensing apparatus according to claim 14, wherein the first sensor and the second sensor are configured to have an angular difference of a half of a reference angle and be spaced apart from each other in the rotation direction, and the third sensor and the fourth sensor are configured to have an angular difference of the half of the reference angle and to be spaced apart from each other in the rotation direction.

16. A rotation sensing apparatus comprising:
a detected part, configured to rotate in rotation directions, comprising a protruding first pattern portion with a plurality of first pattern members, and a protruding second pattern portion with a plurality of second pattern members;

a sensor unit comprising sensors disposed in the rotation directions of the detected part; and a rotation information calculation circuit configured to:
  calculate rotation information of a rotating body in response to oscillation signals based on respective outputs of the sensors,
  sense the rotation directions, in response to a differential signal, generated based on a first oscillation signal of the oscillation signals and a second oscillation signal of the oscillation signals, and an oscillation signal corresponding to one of a maximum frequency and a minimum frequency, from among the first oscillation signal, the second oscillation signal, a third oscillation signal, and a fourth oscillation signal,
  generate a first average signal by averaging the first oscillation signal and the second oscillation signal, and generate a second average signal by averaging the third oscillation signal and the fourth oscillation signal, and
  generate a first subtraction signal by subtracting the first average signal from the first oscillation signal, and to generate a second subtraction signal by subtracting the second average signal from the second oscillation signal.

17. The rotation sensing apparatus according to claim 16, wherein the sensors comprise a first sensor disposed opposite to the protruding first pattern portion, a second sensor disposed opposite to the protruding second pattern portion, a third sensor disposed to be spaced apart from the first sensor and opposite to the protruding first pattern portion, and a fourth sensor disposed to be spaced apart from the second sensor and opposite to the protruding second pattern portion.

18. The rotation sensing apparatus according to claim 17, wherein the first oscillation signal, the second oscillation signal, the third oscillation signal, and the fourth oscillation signal are generated based on respective outputs of the first sensor, the second sensor, the third sensor, and the fourth sensor.

19. The rotation sensing apparatus according to claim 18, wherein the rotation information calculation circuit is further configured to sense the rotation directions, in response to a rising or falling period of the differential signal, and the oscillation signal corresponding to the one of the maximum frequency and the minimum frequency.

* * * * *